(12) United States Patent
Yadani et al.

(10) Patent No.: US 9,082,013 B2
(45) Date of Patent: Jul. 14, 2015

(54) IMAGE RECOGNITION DEVICE, IMAGE RECOGNITION METHOD, PROGRAM, AND INTEGRATED CIRCUIT

(71) Applicant: PANASONIC INTELLECTUAL PROPERTY CORPORATION OF AMERICA, Torrance, CA (US)

(72) Inventors: Kenichi Yadani, Osaka (JP); Ryouichi Kawanishi, Kyoto (JP); Tsutomu Uenoyama, Osaka (JP); Tomohiro Konuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 140 days.

(21) Appl. No.: 13/885,860

(22) PCT Filed: Nov. 27, 2012

(86) PCT No.: PCT/JP2012/007582
§ 371 (c)(1),
(2) Date: May 16, 2013

(87) PCT Pub. No.: WO2013/118218
PCT Pub. Date: Aug. 15, 2013

(65) Prior Publication Data
US 2014/0112530 A1 Apr. 24, 2014

(30) Foreign Application Priority Data
Feb. 9, 2012 (JP) ................................. 2012-025762

(51) Int. Cl.
*G06K 9/00* (2006.01)
*G06K 9/72* (2006.01)
*H04N 5/225* (2006.01)

(52) U.S. Cl.
CPC ........ *G06K 9/00624* (2013.01); *G06K 9/00362* (2013.01); *G06K 9/00684* (2013.01); *G06K 9/72* (2013.01); *G06K 2209/27* (2013.01)

(58) Field of Classification Search
CPC ........................................................ G06K 9/00
USPC ......... 382/103, 159, 165, 170, 181, 229, 236; 348/169, 170, 171, 172, 352
See application file for complete search history.

(56) References Cited

U.S. PATENT DOCUMENTS 7,020,335 B1 * 3/2006 Abousleman ................. 382/199
2002/0001398 A1 1/2002 Shimano et al.
(Continued)

FOREIGN PATENT DOCUMENTS

JP 2002-83297 3/2002
JP 2007-94623 4/2007
(Continued)

OTHER PUBLICATIONS

International Search Report issued Jan. 8, 2013 in corresponding PCT Application No. PCT/JP2012/007582.
(Continued)

*Primary Examiner* — Abolfazl Tabatabai
(74) *Attorney, Agent, or Firm* — Wenderoth, Lind & Ponack, L.L.P.

(57) ABSTRACT

An image recognition device including: a first recognition unit that performs image recognition within an image to find a first object; an obtaining unit that obtains an attribute of the first object found by the first recognition unit; an object specifying unit that refers to object correspondence information showing identifiers of second objects and associating each identifier with an attribute, and specifies an identifier of one of the second objects that is associated with the attribute of the first object; an area specifying unit that refers to area value information showing values that are associated with the identifiers of the second objects and are related to a first area occupied by the first object, and specifies a second area within the image by using a value associated with the identifier of the one of the second objects; and a second recognition unit that performs image recognition within the second area to find the one of the second objects.

13 Claims, 30 Drawing Sheets

FIG. 49

(56) References Cited

U.S. PATENT DOCUMENTS

| | | | |
|---|---|---|---|
| 2010/0021066 A1 | 1/2010 | Sabe | |
| 2011/0050956 A1 | 3/2011 | Bessho | |
| 2012/0314932 A1* | 12/2012 | Nakayama et al. | 382/154 |

FOREIGN PATENT DOCUMENTS

| | | |
|---|---|---|
| JP | 2007-115198 | 5/2007 |
| JP | 2008-139941 | 6/2008 |
| JP | 2010-92199 | 4/2010 |
| JP | 2011-55295 | 3/2011 |

OTHER PUBLICATIONS

Mark Everingham et al., The PASCAL Visual Object Classes Challenge 2011(VOC2011).

Hironobu Fujiyoshi, "Detecting Humans and Visualizing Human Motions for People Image Analysis", pp. 1-22.

Takahiro Ozaki et al., "Vehicle Detection by Two-Stage AdaBoost with Joint HOG Features", Practical Motion Image Processing Workshop (DIA2008), pp. 101-106, 2008 along with English Abstract.

Yamada Yutaka et al., "Hand Detection and Hand Shape Classification Based on Appearance Learning for Sign Language Recognition", Jul. 2009.

* cited by examiner

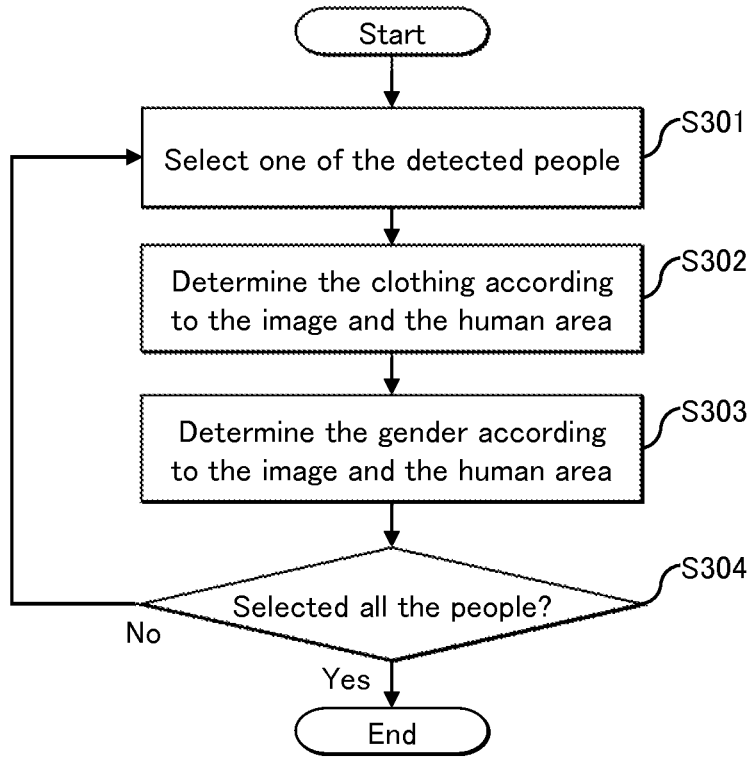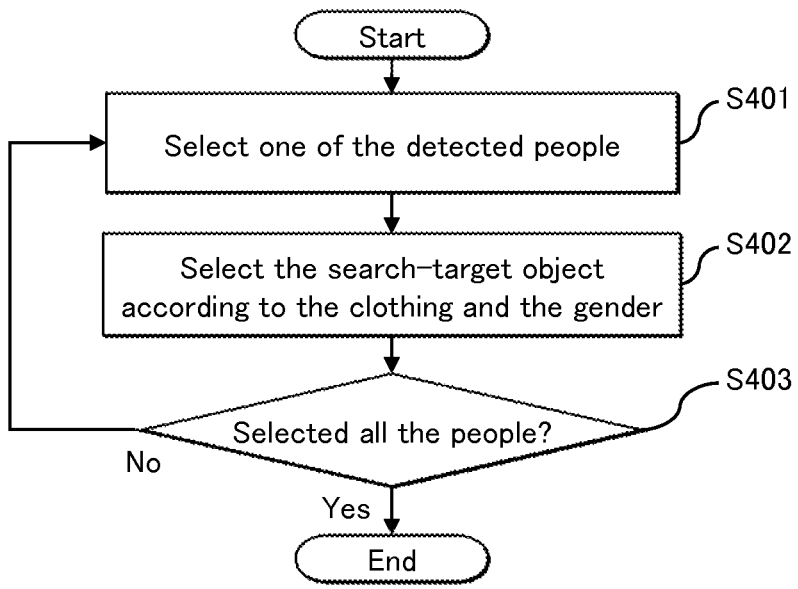

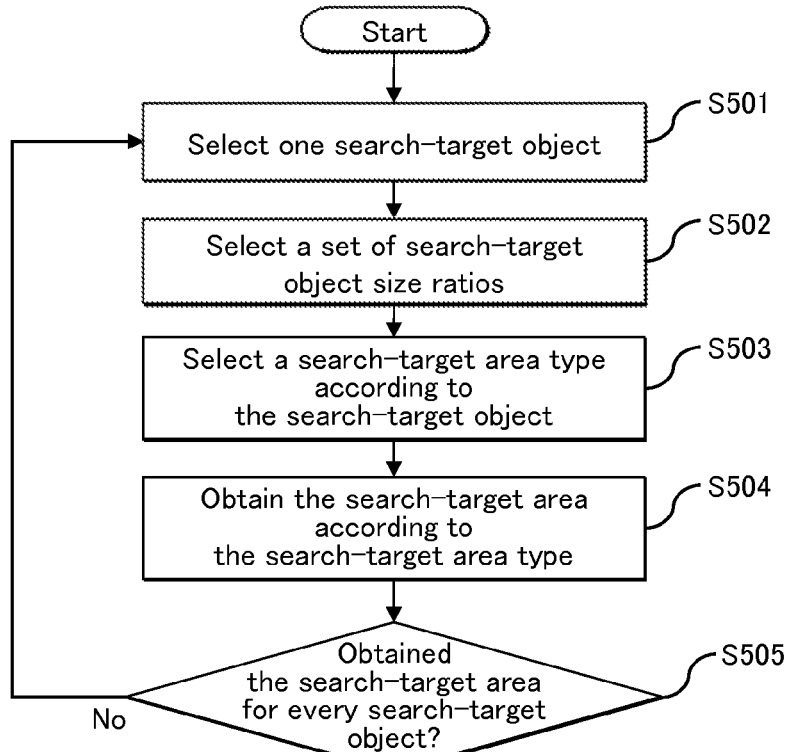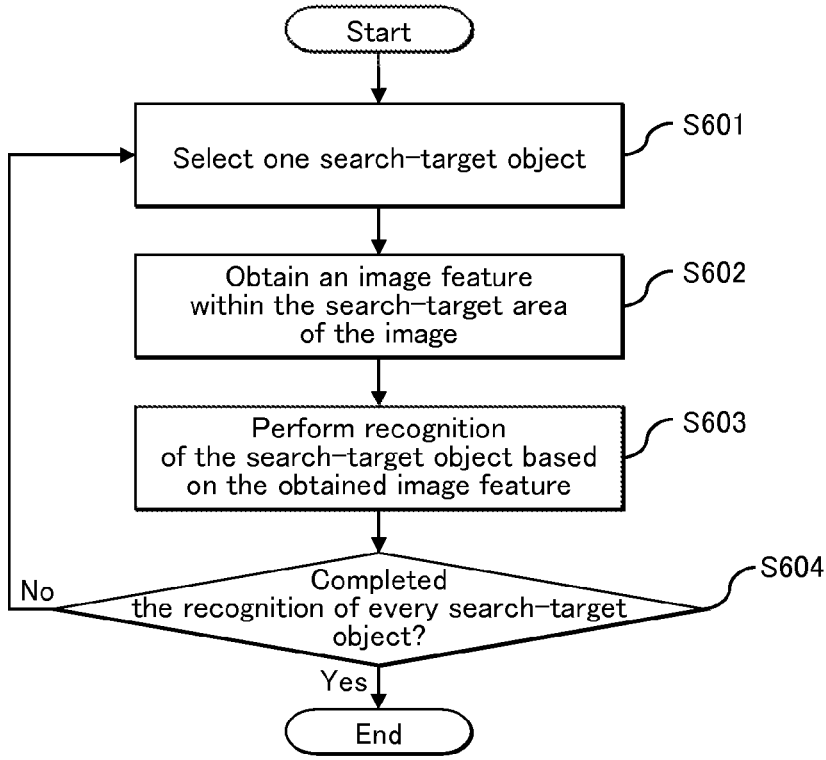

FIG.7

Image management information 701

| Image ID | Image | Recording date |
|---|---|---|
| 11 | | June 10, 2010, 10:35:10 |
| 21 | | April 7, 2011, 11:25:12 |
| 31 | | November 6, 2011, 9:20:15 |
| ... | | ... |

FIG.8

Human area management information 801

| Human ID | Image ID | Area | | | |
|---|---|---|---|---|---|
| | | X coordinate of the top-left point | Y coordinate of the top-left point | Width | Height |
| 11 | 11 | 75 | 50 | 50 | 350 |
| 21 | 21 | 50 | 200 | 48 | 336 |
| 22 | 21 | 300 | 180 | 60 | 420 |
| 31 | 31 | 75 | 50 | 50 | 350 |
| 32 | 31 | 150 | 36 | 52 | 364 |
| ... | ... | ... | ... | ... | ... |

FIG.9

Attribute management information 901

| Human ID | Attribute | |
|---|---|---|
| | Clothing | Gender |
| 11 | Wedding dress | Female |
| 21 | Suit | Male |
| 22 | Suit | Male |
| 31 | Japanese style | Female |
| 32 | Japanese style | Male |
| ... | ... | ... |

FIG.10

Attribute / object correspondence information 1001

| Clothing | Gender | Search-target object |
|---|---|---|
| Japanese style | Male | Chitose-ame, Geta |
| Japanese style | Female | Chitose-ame, Zori |
| Suit | Male | Cake, Microphone, Sign for entrance ceremony |
| Suit | Female | Cake, Microphone, Sign for entrance ceremony |
| Wedding dress | Male | (N/A) |
| Wedding dress | Female | Bouquet, Cake, Microphone |
| ... | ... | ... |

FIG.11

Search-target object management information 1101

| Search-target object ID | Human ID | Search-target object |
|---|---|---|
| 11 | 11 | Bouquet |
| 12 | 11 | Cake |
| 13 | 11 | Microphone |
| 31 | 31 | Chitose-ame |
| 32 | 31 | Zori |
| 33 | 32 | Chitose-ame |
| 34 | 32 | Geta |
| ... | ... | ... |

FIG.12
Object / size correspondence information 1201

| Search-target object | Ratio of the width of the search-target object to the width of the human area | Ratio of the height of the search-target object to the height of the human area |
|---|---|---|
| Bouquet | 0.5 | 0.1 |
| Geta | 0.4 | 0.01 |
| ... | ... | ... |

FIG.13
Object / search-target area type correspondence information 1301

| Search-target object | Search-target area type |
|---|---|
| Bouquet | Hands |
| Geta | Feet |
| Sign for entrance ceremony | Immediate left, Immediate right |
| ... | ... |

FIG.14
Search-target area parameter information 1401

| Coefficients of search-target area formulas | Coefficients of search-target area formulas | | | | | | | |
|---|---|---|---|---|---|---|---|---|
| | $\alpha 1$ | $\alpha 2$ | $\beta 1$ | $\beta 2$ | $\gamma 1$ | $\gamma 2$ | $\delta 1$ | $\delta 2$ |
| Hands | -1 | -1 | 0.4 | -1 | 2 | 2 | 0.2 | 2 |
| Feet | 0 | -1 | 0.95 | -1 | 1 | 2 | 0.1 | 2 |
| Immediate left | 0 | -2 | 1 | -2 | 0 | 2 | 0 | 2 |
| Immediate right | 1 | 0 | 1 | -2 | 0 | 2 | 0 | 2 |
| ... | ... | ... | ... | ... | ... | ... | ... | ... |

FIG.15
Search-target area management information 1501

| Search-target object ID | Search-target area | | | |
|---|---|---|---|---|
| | X coordinate of the top-left point | Y coordinate of the top-left point | Width | Height |
| 11 | 0 | 155 | 150 | 140 |
| 12 | 0 | 155 | 150 | 140 |
| 13 | 10 | 168 | 130 | 112 |
| 21 | 121 | 1 | 162 | 1134 |
| ... | ... | ... | ... | ... |

Object recognition management information 1601

| Search-target object ID | Recognition result |
|---|---|
| 11 | Yes |
| 12 | No |
| 13 | No |
| 21 | Yes |
| ... | ... |

Object / search-target area parameter information 1701

| Search-target object | Coefficients of search-target area formulas | | | | | | | |
|---|---|---|---|---|---|---|---|---|
| | $\alpha1$ | $\alpha2$ | $\beta1$ | $\beta2$ | $\gamma1$ | $\gamma2$ | $\delta1$ | $\delta2$ |
| Bouquet | -0.25 | -1 | 0.4 | -1 | 1.5 | 2 | 0.2 | 2 |
| Geta | 0 | -1 | 0.95 | -1 | 1 | 2 | 0.1 | 2 |
| ... | ... | ... | ... | ... | ... | ... | ... | ... |

FIG.28
Attribute / object correspondence information 2801

| Attributes of the first person | | Attributes of the second person | | Condition of the difference between the X coordinates of the top-left points of the two people | Search-target object |
|---|---|---|---|---|---|
| Clothing | Gender | Clothing | Gender | | |
| Wedding dress | Female | Suit | Male | Equal to or smaller than the sum of the widths of the human areas of the two people multiplied by 0.3 | Wedding cake |
| Suit | Male | Suit | Male | Equal to or greater than the sum of the widths of the human areas of the two people | Sign for entrance ceremony |
| Suit | Male | Suit | Female | Equal to or greater than the sum of the widths of the human areas of the two people | Sign for entrance ceremony |
| Suit | Female | Suit | Male | Equal to or greater than the sum of the widths of the human areas of the two people | Sign for entrance ceremony |
| Suit | Female | Suit | Female | Equal to or greater than the sum of the widths of the human areas of the two people | Sign for entrance ceremony |
| ... | ... | ... | ... | ... | ... |

FIG.29
Search-target object management information 2901

| Search-target object ID | Human ID of the first person | Human ID of the second person | Search-target object |
|---|---|---|---|
| 21 | 21 | 22 | Sign for entrance ceremony |
| 41 | 41 | 44 | Sign for entrance ceremony |
| ... | ... | ... | ... |

FIG.30
Object / size correspondence information 3001

| Search-target object | Object / size correspondence information | Ratio of the height of the search-target object to the height of the human area |
|---|---|---|
| Wedding cake | 0.5 | 0.1 |
| Sign for entrance ceremony | 1.5 | 1.5 |
| ... | ... | ... |

FIG.31
Object / search-target area type correspondence information 3101

| Search-target object | Search-target area type |
|---|---|
| Wedding cake | In front of two people |
| Sign for entrance ceremony | Between two people |
| ... | ... |

FIG.32
Search-target area parameter information 3201
| Search-target area type | Coefficients of search-target area formulas | | | | | | | |
|---|---|---|---|---|---|---|---|---|
| | α1 | α2 | β1 | β2 | γ1 | γ2 | δ1 | δ2 |
| In front of two people | −0.5 | −1 | 0.4 | −1 | 2 | 2 | 0.2 | 2 |
| Between two people | 0.5 | −1 | 1 | −1 | 0 | 2 | 0 | 2 |
| ... | ... | ... | ... | ... | ... | ... | ... | ... |
FIG.33
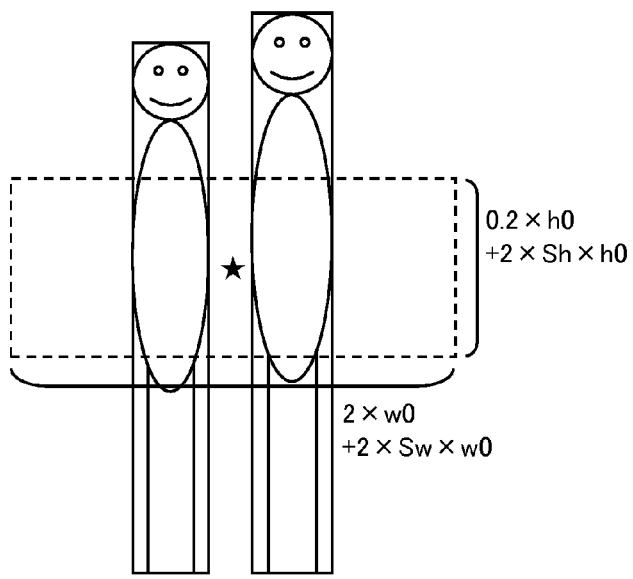
FIG.34
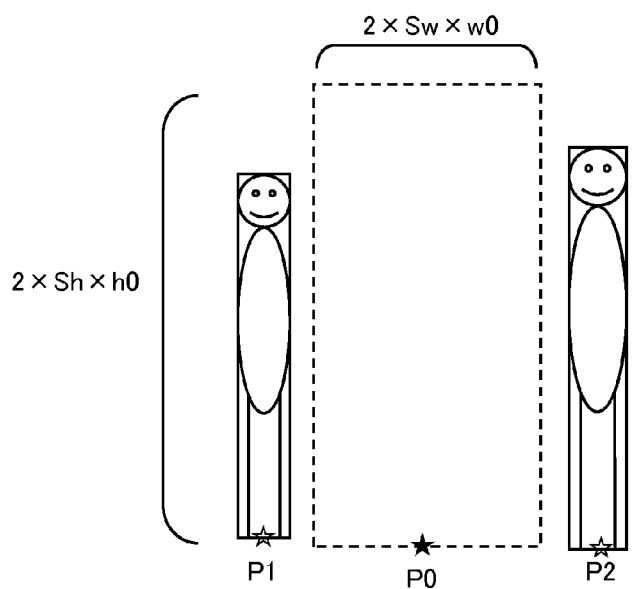

FIG.40

Event condition information 4001

| Captured event | Clothing | Gender | Recording date |
|---|---|---|---|
| Wedding ceremony | Wedding dress | Female | N/A |
| Seijin-shiki | Japanese style | Female | January |
| Shichi-go-san | Japanese style | N/A | November |
| ... | ... | ... | ... |

FIG.41

Captured-event management information 4101

| Image ID | Captured event |
|---|---|
| 31 | Shichi-go-san |
| 52 | Wedding ceremony |
| ... | ... |

FIG.42

Attribute / event / object correspondence information 4201

| Clothing | Gender | Captured event | Search-target object |
|---|---|---|---|
| Suit | Male | Wedding ceremony | Cake, Microphone |
| Suit | Male | Seijin-shiki | Bag |
| Japanese style | Female | Wedding ceremony | Cake, Microphone |
| Japanese style | Male | Shichi-go-san | Chitose-ame, Geta |
| Japanese style | Female | Shichi-go-san | Chitose-ame, Zori |
| ... | ... | ... | ... |

FIG.45

Attribute management information 4501

| Car ID | Attributes | |
| --- | --- | --- |
| | State of the door | Speed |
| 11 | Open | 0 (Stopping) |
| 12 | Closed | High speed |
| ... | ... | ... |

Object / search-target area type correspondence information 4502

| Search-target object | Search-target area type |
| --- | --- |
| Person | Beside the door |
| Traffic light | Above the car |
| ... | ... |

FIG. 46A Decoration
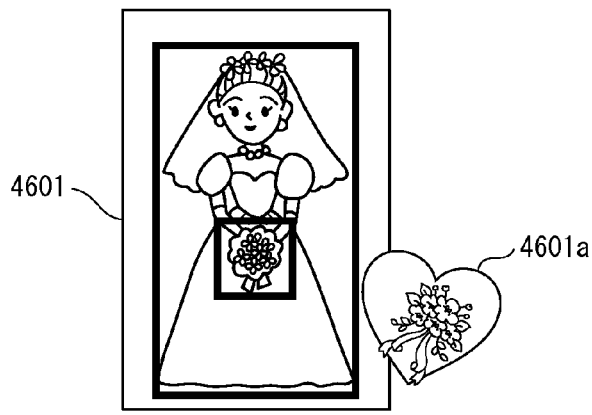
FIG. 46B Trimming
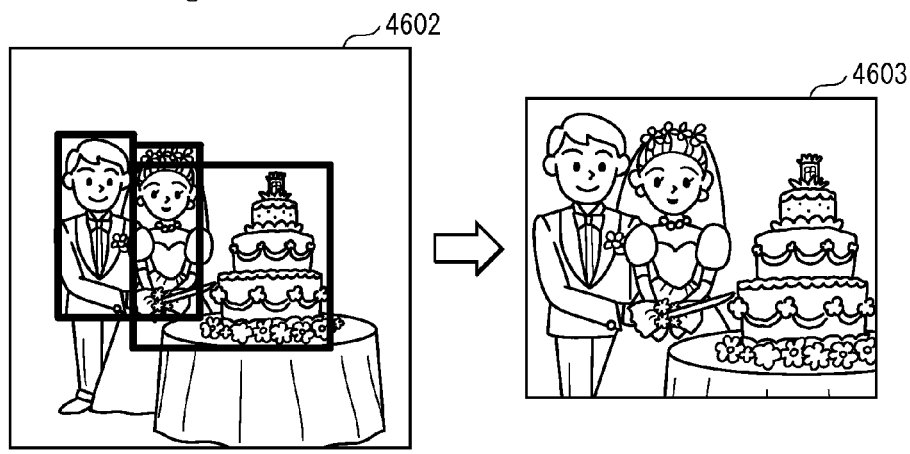
FIG. 46C Page layout
Page 1:
Scene of cake cutting
Page 2:
Scene of bouquet toss
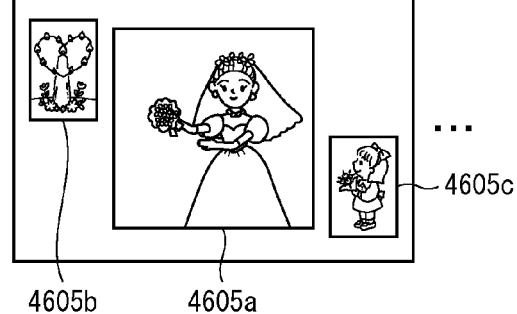

FIG. 50
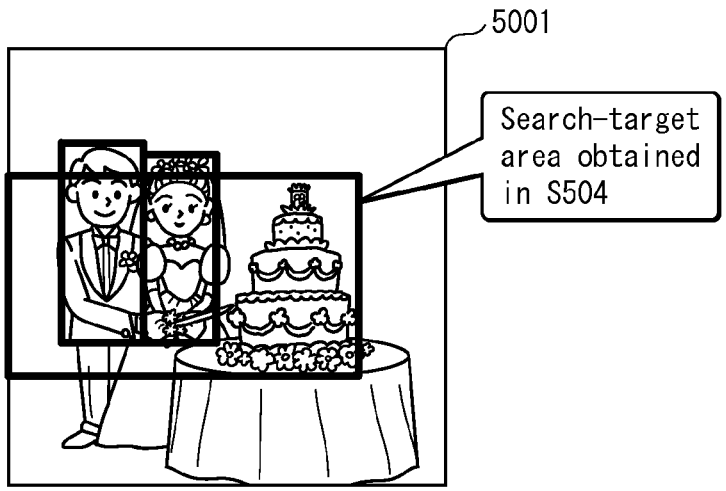
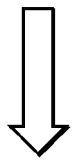

IMAGE RECOGNITION DEVICE, IMAGE RECOGNITION METHOD, PROGRAM, AND INTEGRATED CIRCUIT

TECHNICAL FIELD

The present invention relates to an image recognition device for recognizing objects contained in an image.

BACKGROUND ART

There have been known conventional technology of recognizing objects contained in an image (e.g. Patent Literatures 1, 2 and 3).

The recognition accuracy of an object depends on what the object is. For example, according to the results of PASCAL Visual Object Classes Challenge (VOC2011) which is a contest of object recognition (see Non-Patent Literature 1), the recognition accuracy of some of given twenty objects is about only 60%.

CITATION LIST

Patent Literature

[Patent Literature 1] Japanese Patent Application Publication No. 2008-139941
[Patent Literature 2] Japanese Patent No. 4624594
[Patent Literature 3] Japanese Patent No. 4687381

Non-Patent Literature

[Non-Patent Literature 1] PASCAL Visual Object Classes Challenge (VOC2011), [online], [searched on Oct. 10, 2012], Internet <URL: http://pascallin.ecs.soton.ac.uk/challenges/VOC/voc2011/workshop/voc#cls.pdf>

SUMMARY OF INVENTION

Technical Problem

Since the recognition accuracy can be low depending on what the object is as mentioned above, there has been a demand for improvement of the recognition accuracy.

To fulfill the demand, the present invention aims to provide an image recognition device that contributes to the improvement of the recognition accuracy.

Solution to Problem

To solve the problem, one aspect of the present invention provides an image recognition device comprising: a first recognition unit that performs image recognition within an image to find a first object; an obtaining unit that obtains an attribute of the first object found by the first recognition unit; an object specifying unit that refers to object correspondence information showing identifiers of second objects and associating each identifier with an attribute, and specifies an identifier of one of the second objects that is associated with the attribute of the first object; an area specifying unit that refers to area value information showing values that are associated with the identifiers of the second objects and are related to a first area occupied by the first object, and specifies a second area within the image by using a value associated with the identifier of the one of the second objects; and a second recognition unit that performs image recognition within the second area to find the one of the second objects.

Advantageous Effects of Invention

With the structure described in "Solution to problem" above, the image recognition device specifies the subject to be processed by the second recognition unit by specifying the identifier of the second object based on the attribute of the first object. Furthermore, the image recognition device specifies the second area, within which the second recognition unit performs the processing, by using the value specifying the area associated with the identifier of the second object that has been specified. These operations contribute to improvement of the recognition accuracy.

BRIEF DESCRIPTION OF DRAWINGS

FIG. 3 is a flowchart showing an example of processing procedures pertaining to Embodiment 1 performed for obtaining attributes of a detected reference object.

FIG. 4 is a flowchart showing an example of processing procedures pertaining to Embodiment 1 performed for specifying a search-target object.

FIG. 5 is a flowchart showing an example of processing procedures pertaining to Embodiment 1 performed for specifying a search-target area.

FIG. 6 is a flowchart showing an example of processing procedures pertaining to Embodiment 1 performed for recognizing a search-target object.

FIG. 7 shows an example of image management information.

FIG. 8 shows an example of human area management information.

FIG. 9 shows an example of attribute management information.

FIG. 10 shows an example of attribute/object correspondence information pertaining to Embodiment 1.

FIG. 11 shows an example of search-target object management information pertaining to Embodiment 1.

FIG. 12 shows an example of object/size correspondence information pertaining to Embodiment 1.

FIG. 13 shows an example of object/search-target area type correspondence information pertaining to Embodiment 1.

FIG. 14 shows an example of search-target area parameter information pertaining to Embodiment 1.

FIG. 15 shows an example of search-target area management information.

FIG. 28 shows an example of attribute/object correspondence information pertaining to Embodiment 2.

FIG. 29 shows an example of search-target object management information pertaining to Embodiment 2.

FIG. 30 shows an example of object/size correspondence information pertaining to Embodiment 2.

FIG. 31 shows an example of object/search-target area type correspondence information pertaining to Embodiment 2.

FIG. 32 shows an example of search-target area parameter information pertaining to Embodiment 2.

FIG. 33 shows an example of the search-target area in the case the search-target area type is "In front of two people".

FIG. 34 shows an example of the search-target area in the case the search-target area type is "Between two people".

FIG. 40 shows an example of event condition information.

FIG. 41 shows an example of event management information.

FIG. 42 shows an example of attribute/event/object correspondence information.

FIG. 45 shows an example of attribute management information 4501 and an example of object/search-target area type correspondence information 4502 in the case the reference object is a car.

FIGS. 46A through 46C show an example of the usage of the object recognition results.

FIG. 50 illustrates S4902 in FIG. 49.

DESCRIPTION OF EMBODIMENTS

Embodiment 1
<Circumstances Leading to Embodiment 1>

One approach to recognize objects from an image is to repeat object recognition for each one of various kinds of objects without any restriction. Such an approach, however, is not efficient and there is a risk of misrecognition.

Therefore, an image recognition device pertaining to the present embodiment, when detecting a person in an image, first obtains attributes of the person. Then, the image recognition device refers to information showing the correspondence between attributes and search-target candidate objects beforehand stored in the image recognition device, and specifies the object to be searched for that corresponds to the obtained attributes.

The present embodiment thus aims to improve the recognition accuracy by appropriately specifying the object to be searched for according to the attributes of the person as an object in the image.

Furthermore, after specifying the object to be searched for, the image recognition device specifies the area to be searched by referring to parameters which are based on the correspondence between the search-target candidate objects and human areas beforehand stored in the image recognition device.

By specifying such an area, the image recognition device avoids erroneously recognizing another portion of the image outside the area as the object to be searched for even if the portion has a similar feature to the object, and thus further improves the recognition accuracy.

The following describes an image recognition device pertaining to Embodiment 1 with reference to the drawings.
<Structure>

Figure 1:
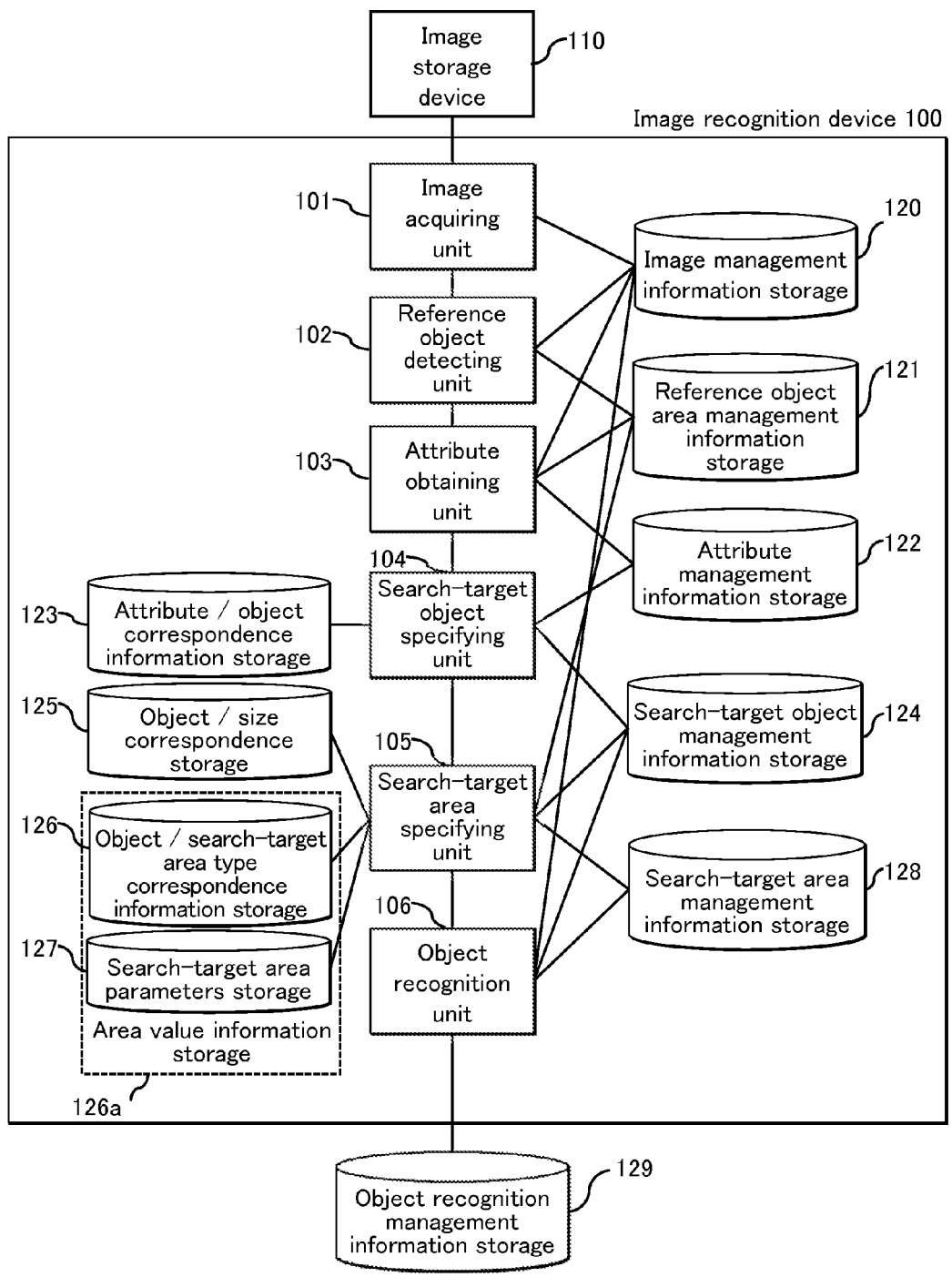
FIG. 1 is a functional block diagram of an image recognition device 100 pertaining to Embodiment 1.

FIG. 1 is a functional block diagram of an image recognition device 100.

The image recognition device 100 is connected to an image storage device 110 via a cable such as a Universal Serial Bus (USB) cable.

The image storage device 110 has a function to store captured images. The image storage device 110 may have a function to capture images in addition to the function to store captured images. Examples of the image storage device 110 include a hard disk and a digital still camera.

Next, description is given to the internal structure of the image recognition device 100.

As shown in FIG. 1, the image recognition device 100 includes an image acquiring unit 101, a reference object detecting unit 102, an attribute obtaining unit 103, a search-target object specifying unit 104, a search-target area specifying unit 105 and an object recognition unit 106.

The image acquiring unit 101 acquires images from the image storage device 110, and writes image management information into the image management information storage 120. The image management information associates the acquired images with unique image IDs. The image acquiring unit 101 includes, for example, an USB port for an USB cable, and software for controlling an interface such as an USB driver.

The reference object detecting unit 102 detects a reference object for the recognition from an image. Specifically, the reference object detecting unit 102 detects, from an image acquired by the image acquiring unit 101, a reference object that serves as the standard for specifying the object to be recognized or the area in which the recognition is to be performed. Examples of the reference object include a person, a car, and so on. The reference object adopted in the present embodiment is a person.

The reference object detecting unit 102 also detects human areas, which are areas showing a person. The reference object detecting unit 102 detects the locations of the detected human areas, and calculates the sizes of the human areas while giving a unique human ID to each human area. Then, the reference object detecting unit 102 writes human area management information into reference object area management information storage 121. The human area management information associates the human IDs of the human areas and the locations and sizes of the human areas with the image IDs.

Note that the term "human area" means an area occupied by each single person in an image.

The location of each rectangular human area is defined by the coordinates of one of four vertices of the rectangular area on the coordinate system with the origin at the top-left point of the image, and the size of each human area is defined by the width and the height of the rectangular area.

An approach for human area detection adopted in the following example is to detect a face area by using facial learning models prepared beforehand, and clips a human area based on an average relationship between the face and the entire body of a person in terms of their positions and sizes. Alternatively, a smallest rectangular area enclosing the entire body of a single person appearing in an image may be detected as a human area.

The attribute obtaining unit 103 obtains attributes of a reference object detected by the reference object detecting unit 102. The attributes are obtained from a feature of the reference object related to its appearance. The present embodiment uses the clothing and the gender as the attributes of the person as the reference object. If this is the case, the attribute obtaining unit 103 determines the clothing and the gender for each human area, associates these attributes with the human ID of the human area, and writes them into the attribute management information storage 122.

The search-target object specifying unit 104 specifies the object related to the attributes of the reference object, as the object to be searched for (hereinafter referred to as "the search-target object"). Specifically, the search-target object specifying unit 104 refers to information showing the correspondence between attributes and search-target candidate objects stored beforehand in an attribute/object correspondence information storage 123, and specifies the search-target object that corresponds to the attributes obtained by the attribute obtaining unit 103. Then the search-target object specifying unit 104 writes search-target object management information into the search-target object management information storage 124. The search-target object management information associates the specified search-target object with the human ID.

The search-target area specifying unit 105 specifies the area in which the recognition of the search-target object is to be performed, based on the location of the area occupied by the reference object. Hereinafter, the area in which the recognition of the search-target object is to be performed is referred to as "search-target area". Specifically, the search-target area specifying unit 105 specifies the area corresponding to the search-target object specified by the search-target object specifying unit 104 by referring to object area parameter information and object/search-target area type correspondence information stored beforehand in an area value information storage 126a. The object area parameter information is used for specifying the search-target area based on the area occupied by the reference object. The object/search-target area type correspondence information shows the correspondence between the search-target object and the search-target area type.

Note that "specifying the area" means to obtain information that can specify the location and the size of the area. In the present embodiment, the area is defined as a rectangular area on the coordinate system with the origin at the top-left point of the image, and the search-target area specifying unit 105 obtains the coordinates of one of four vertices of the rectangular area, and the width and the height of the rectangular area.

Within the search-target area specified by the search-target area specifying unit 105, the object recognition unit 106 performs the recognition of the search-target object specified by the search-target object specifying unit 104. Example methods for the recognition include detection by pattern matching using an object dictionary provided beforehand, and classification by machine learning using a Support Vector Machine (SVM).

Note that the reference object detecting unit 102, the attribute obtaining unit 103, the search-target object specifying unit 104, the search-target area specifying unit 105 and the object recognition unit 106 can be structured from a memory storing programs corresponding to their respective processing, such as a ROM, a CPU executing the programs, and a memory used for expanding data for the programs, such as a RAM.

The following are descriptions of the storages. Details of the information stored in each storage will be described in the explanation of the operations.

The image management information storage 120 stores image management information 701 (see FIG. 7).

The reference object area management information storage 121 stores human area management information 801 (see FIG. 8).

The attribute management information storage 122 stores attribute management information 901 (See FIG. 9).

The attribute/object correspondence information storage 123 stores attribute/object correspondence information 1001 (See FIG. 10).

The search-target object management information storage 124 stores search-target object management information 1101 (See FIG. 11). An Object/size correspondence storage 125 stores object/size correspondence information 1201 (See FIG. 12).

The area value information storage 126a includes an object/search-target area type correspondence information storage 126, which stores object/search-target area type correspondence information 1301 (See FIG. 13) and a search-target area parameter storage 127, which stores object area parameter information 1401 (See FIG. 14).

The search-target area management information storage 128 stores search-target area management information 1501 (See FIG. 15).

Figures 16, 17, 18:
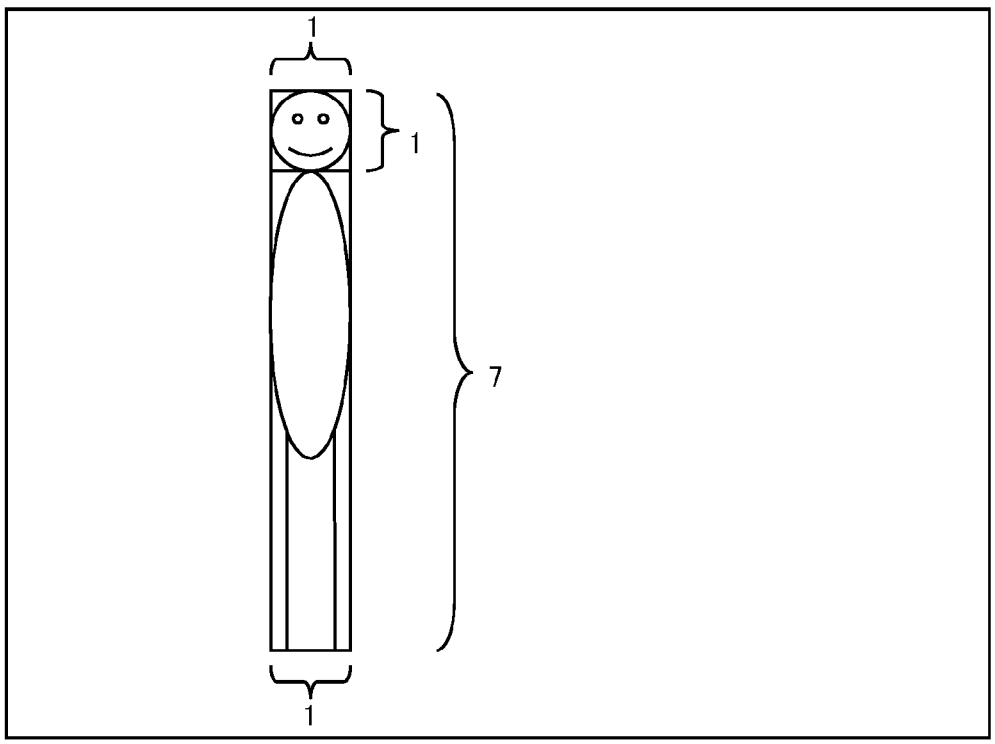
FIG. 16 shows an example of object recognition management information.
FIG. 17 shows an example of object/search-target area parameter information.
FIG. 18 shows an example of a face area and a human area.

The object recognition management information storage 129 stores object recognition management information 1601 (See FIG. 16).

<Operations>

Figure 2:
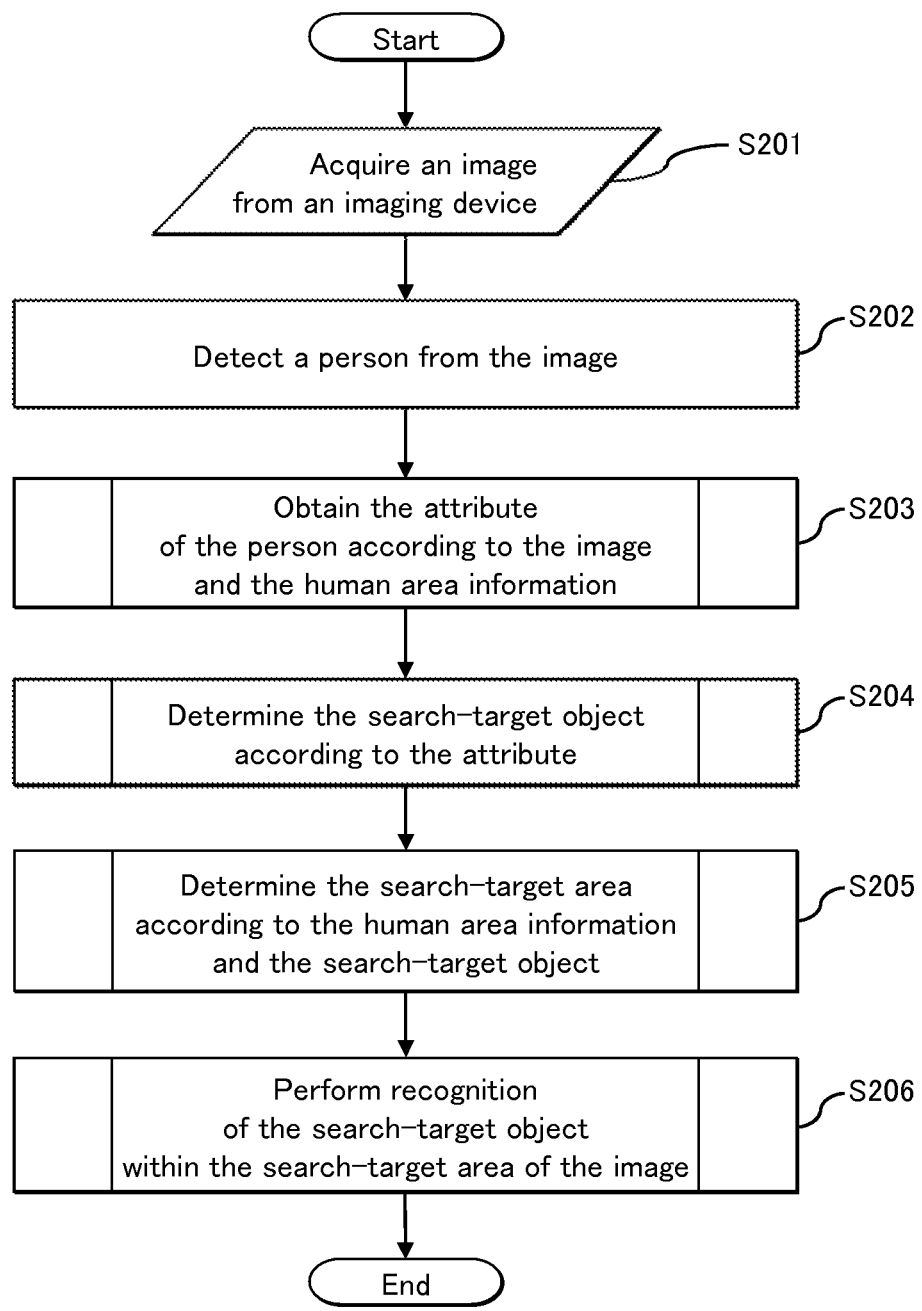
FIG. 2 is a flowchart showing an example of the entire operations performed by the image recognition device 100 pertaining to Embodiment 1.

The following describes the overview of the entire operations performed by the image recognition device 100, with reference to the flowchart shown in FIG. 2. Also, the details of Steps S203, S204, S205 and S206 shown in FIG. 2 are described with reference to FIG. 3, FIG. 4, FIG. 5 and FIG. 6, respectively.

The image acquiring unit 101 acquires images from the image storage device 110 (S201). Then, the image acquiring unit 101 associates each image with a unique image ID, and writes them into the image management information storage 120, as image management information 701.

FIG. 7 shows an example of the image management information 701. In the example shown in FIG. 7, images in Portable Pixmap (PPM) format are managed together with their respective recording dates, in association with the image IDs. In the example shown in FIG. 7, an image of a bride having a bouquet, whose recording date is "Jun. 10, 2010, 10:35:10", is managed with the image ID "11". Here, the recording date of an image may be the date at which the image file is saved or the date provided by the Exchangeable image file format (Exif).

The format of the images is not limited to the format mentioned above. For example, Joint Photographic Experts Group (JPEG) format may be used instead of the PPM format. Alternatively, the file paths of the images within the image storage device 110 may be used.

Next, the reference object detecting unit 102 detects a person as the reference object from each of the images stored in the image management information storage 120 (S202). In the present embodiment, the reference object detecting unit 102, when detecting a person, detects an area showing the whole body of a person, including the face and the other parts. Such detection is performed in the following manner, for example. First, the reference object detecting unit 102 detects the facial area from the image. The detection of the facial area is performed by, for example, pattern matching based on the image and facial learning models prepared beforehand. Next, the reference object detecting unit 102 obtains a human area based on the facial area. The human area is obtained by, for example, clipping the human area based on an average relationship between the face and the entire body of a person in terms of their positions and sizes.

In the example shown in FIG. 18, it is assumed that the facial area is rectangular, and a body area is defined as six times the facial area arranged immediately below the facial area. The human area is defined as the area composed of the facial area and the body area. For example, when the facial area has the width of 50 pixels and the height of 50 pixels, the reference object detecting unit 102 clips out, as the human area, a rectangular area having the width of 50 pixels and the height of 350 pixels with reference to the top-left point of the facial area.

Note that the size of the body area is not limited to the size of the example shown in FIG. 18 as far as the entire body can be enclosed within the body area. Furthermore, the shape of the facial area, the shape of the body area, and the shape of the human area composed of them are not limited to be rectangular. Any shape may be adopted as far as the face, the body and the entire human body can be enclosed within the area. The method of human detection is not limited to the above-described method, and an approach using edge features of the image as shown in "Detecting Humans and Visualizing Human Motions for People Image Analysis" written by Fujiyoshi may be adopted.

The reference object detecting unit 102 adds a unique human ID to each human area detected from the image, and associates it with an image ID. Then, the reference object detecting unit 102 associates the human IDs, the image IDs, and the sizes and the positions of the human areas, and writes them into the reference object area management information storage 121, as the human area management information 801.

FIG. 8 shows an example of the human area management information 801. In the example shown in FIG. 8, it is assumed that each human area is rectangular, and the X coordinate of the top-left point, the Y coordinate of the top-left point, the width, the height, and the image ID are managed in association with the human ID for each human area. Note that the coordinates are represented in units of pixels by using the X-Y coordinate system with the origin at the top-left point of the image, the X axis extending in the widthwise direction of the image, and the Y axis extending in the heightwise direction of the image. In the example shown in FIG. 8, the human area with the human ID "11" is a rectangular area having the top-left point represented by the coordinates (75, 50), the width of pixels, and the height of 350 pixels.

Next, the attribute obtaining unit 103 obtains the attribute of the detected person based on the human area management information 801 stored in the reference object area management information storage 121 (S203).

The following explains an example of Step S203 for obtaining the attribute of the reference object thus detected, with reference to the flowchart shown in FIG. 3.

First, the attribute obtaining unit 103 selects one human ID from among the human IDs of the people detected from the image (S301). Specifically, the attribute obtaining unit 103 selects a row including a human ID from the table of the human area management information 801 as shown in FIG. 8.

Next, the attribute obtaining unit 103 determines, for each human area detected in the image, the clothing that the person belonging to the human area wears (S302). An example method that can be adopted for determining the clothing is discussed in Patent Literature 1.

Next, the attribute obtaining unit 103 determines, for each human area detected in the image, the gender of the person belonging to the human area (S303). An example method that can be adopted for determining the gender is to compare the image feature of the facial area in the image with learning models defining average image feature of a male and a female.

In the description above, the clothing and the gender are used as the attribute. However, it is possible to use the position of the human area in the image, the ratio in size of the human area to the entire image, the age (or generation), the orientation of the face, the orientation of the body, the posture, or the like. For example, the position of the human area and the ratio in size of the human area to the entire image can be obtained from the information stored in the reference object body area management information storage 121 and the size of the image. The age (or generation) and the orientation of the face can be obtained by, for example, comparing the image feature of the facial area in the image with the learning models classified according to the age (or generation) and the orientation of the face. The orientation of the body and the posture can be obtained by, for example, comparing the image feature of the human area in the image with the learning models classified according to the orientation of the body and the posture. Note that it is not necessary to obtain all the attributes described above, but at least one of them needs to be obtained.

The attribute obtaining unit 103 associates the attributes of each human area thus obtained with the human ID of the human area, and writes them into the attribute management information storage 122, as the attribute management information 901.

FIG. 9 shows an example of the attribute management information 901. In the example shown in FIG. 9, the attributes, namely the clothing and the gender, are managed in association with the human IDs. In this example, the attributes of the person having the human ID "11" show that the clothing is "Wedding dress" and the gender is "Female".

After Step S303, the attribute obtaining unit 103 determines whether the attributes have been obtained from every person contained in the image (S304). If the attribute obtaining unit 103 has not obtained the attributes from any of the people (No in S304), the attribute obtaining unit 103 returns to Step S301. In S304, if the attribute obtaining unit 103 has obtained the attributes from every person in the image (Yes in S304), the attribute obtaining unit 103 finishes Step S203.

Next, returning to FIG. 2, the search-target object specifying unit 104 specifies the search-target object based on the attribute management information 901 (S204).

The following explains an example of Step S204 with reference to the flowchart shown in FIG. 4.

First, the search-target object specifying unit 104 selects one human ID from among the human IDs of the people detected from the image (S401). Specifically, the search-target object specifying unit 104 selects a row including a human ID from the table of the attribute management information 901 as shown in FIG. 9.

Next, the search-target object specifying unit 104 specifies the search-target objects based on the attributes corresponding to the selected human ID (S402). To specify the search-target objects, the search-target object specifying unit 104 selects the search-target objects matching with the attributes of the selected human ID by using the attribute/object correspondence information 1001 stored in the attribute/object correspondence information storage 123. The attribute/object correspondence information 1001 shows the correspondence between the attributes and the search-target objects.

FIG. 10 shows an example of the attribute/object correspondence information 1001. In the example shown in FIG. 10, candidates for the search-target objects are managed in association with the attributes, namely the clothing and the gender. In this example, "Chitose-ame" (a candy stick) and "Geta" (wooden clogs) are specified as the search-target objects when the attributes show "Japanese style" as the clothing and "Male" as the gender.

Then, the search-target object specifying unit 104 associates each of the specified search-target objects with a unique search-target object ID, and writes them into the search-target object management information storage 124, as the search-target object management information 1101.

FIG. 11 shows an example of the search-target object management information 1101. In the example shown in FIG. 11, the human IDs and the search-target objects are managed in association with the search-target object IDs. This example shows that the object with the search-target object ID "11" is the object corresponding to the human ID "11", and that the search-target object is "Bouquet".

After Step S402, the search-target object specifying unit 104 determines whether the search-target objects have been specified for every person contained in the image (S403). If the search-target object specifying unit 104 has not specified the search-target objects for any of the people (No in S403), the search-target object specifying unit 104 returns to Step S401. In S403, if the search-target object specifying unit 104 has specified the search-target objects for every person in the image (Yes in S403), the search-target object specifying unit 104 finishes Step S204.

Next, returning to FIG. 2, the search-target area specifying unit 105 specifies the search-target area based on the human area management information 801, the search-target object management information 1101 and the object/size correspondence information 1201 (S205).

The following explains an example of Step S205 with reference to the flowchart shown in FIG. 5.

First, in S204, the search-target area specifying unit 105 selects one search-target object ID from among the search-target object IDs specified for the people detected from the image (S501). Specifically, the search-target area specifying unit 105 selects a row including a search-target object ID from the table of the search-target object management information 1101 as shown in FIG. 11.

Next, the search-target area specifying unit 105 selects a set of search-target object size ratios for the search-target object corresponding to the selected search-target object ID by using the object/size correspondence information 1201 (S502).

The object/size correspondence information 1201 is stored in the object/size correspondence storage 125, and associates a set of search-target object size ratios with each search-target object. Each set of search-target object size ratios shows the ratios in size of the search-target object to the human area. In the present embodiment, it is assumed that the human area is rectangular. Therefore, each set of the search-target object size ratios is composed of the ratio of the width of the search-target object to the width of the human area and the ratio of the height of the search-target object to the height of the human area.

An example of the object/size correspondence information 1201 is shown in FIG. 12. In the example shown in FIG. 12, the ratios of the widths and the heights of the search-target objects to the width and the height of a person are managed in association with the search-target objects. In this example, the width of "Bouquet" is 0.5 times the width of a person, and the height of "Bouquet" is 0.1 times the height of a person.

In this case, the search-target area specifying unit 105 selects the ratios of the width and the height of the search-target object corresponding to the search-target object ID selected in S501.

The search-target object size ratios thus selected are used for obtaining the search-target area in S504, which will be described later.

Next, the search-target area specifying unit 105 selects a search-target area type for the search-target object corresponding to the selected search-target object ID (S503). The search-target area type is the type of a particular area near the reference object. This particular area suggests that the search-target object exists near the area. When the reference object is a person, examples of the search-target area type include "Hands", "Feet", "Immediate right" and "Immediate left". The search-target area specifying unit 105 specifies the search-target area type by selecting the search-target area type matching with the search-target object by using the object/search-target area type correspondence information 1301 stored in the object/search-target area type correspondence information storage 126.

FIG. 13 shows an example of object/search-target area type correspondence information 1301. In the example shown in FIG. 13, the search-target area types are managed in association with the search-target objects. In this example, the search-target area type corresponding to "Bouquet" is "Hands".

The search-target area type thus selected is used for obtaining the search-target area in S504, which will be described later.

Next, the search-target area specifying unit 105 obtains the search-target area corresponding to the selected search-target object ID (S504).

The search-target area is obtained by size change and/or parallel displacement of the human area. Specifically, the search-target area specifying unit 105 specifies the search-target area by substituting parameters into search-target area formulas. The parameters are obtained from the search-target area parameter information 1401 stored in the search-target area parameter storage 127 and information about the human area indicated by the selected human ID. Here, the search-target area formulas are used for obtaining the rectangular search-target area by size change and/or parallel displacement of the rectangular human area. The search-target area formulas consist of: a formula for obtaining a displacement (including the direction and the magnitude) from the top-left point of the human area to the top-left point of the search-target area; a formula for obtaining the width of the search-target area; and a formula for obtaining the height of the search-target area. When the displacement from the top-left point of the human area to the top-left point of the search-target area is represented by coordinates (dX,dY) and the width and the height of the search-target area are represented by W and H respectively, dX, dY, W and H can be represented by the following formulas, for example.

$$dX = \alpha1 \times w + \alpha2 \times Sw \times w \quad \text{(Formula 1)}$$

$$dY = \beta1 \times h + \beta2 \times Sh \times h \quad \text{(Formula 2)}$$

$$W = \gamma1 \times w + \gamma2 \times Sw \times w \quad \text{(Formula 3)}$$

$$H = \delta1 \times h + \delta2 \times Sh \times h \quad \text{(Formula 4)}$$

Here, w denotes the width of the human area, and h denotes the height of the human area. These values are obtained by selecting a row including the selected human ID from the table of the human area management information 801. Sw denotes the ratio of the width of the search-target object to the width of the human area, and Sh denotes the ratio of the height of the search-target object to the height of the person. These values are obtained in S502. The search-target area parameters α1, α2, β1, β2, γ1, γ2, δ1 and δ2 are used for obtaining the search-target area from the human area and the search-target area type. Specifically: α1 and α2 respectively denote the degree of contribution of the width of the human area to dX and the degree of contribution of the width of the search-target object to dX; β1 and β2 respectively denote the degree of contribution of the height of the human area to dY and the degree of contribution of the height of the search-target object to dY; γ1 and γ2 respectively denote the degree of contribution of the width of the human area to the width of the search-target area and the degree of contribution of the width of the search-target object to the width of the search-target area; and δ1 and δ2 respectively denotes the degree of contribution of the height of the human area to the height of the search-target area and the degree of contribution of the height of the search-target object to the search-target area. The search-target area specifying unit 105 selects the search-target area parameters matching with the search-target area type by using the search-target area parameter information 1401 stored in the search-target area parameter storage 127.

FIG. 14 shows an example of the search-target area parameter information 1401. In the example shown in FIG. 14, the coefficients for the search-target area formulas are managed in association with the search-target area type. Each of the search-target area types, namely "Hands", "Feet", "Immediate left" and "Immediate right" is associated with the coefficients α1, α2, β1, β2, γ1, γ2, δ1 and δ2 for the search-target area formulas.

The following describes an example of specification of the search-target area using the search-target area parameter information for each of the search-target area types (1) through (4) shown next.

(1) Hands

Figure 19:
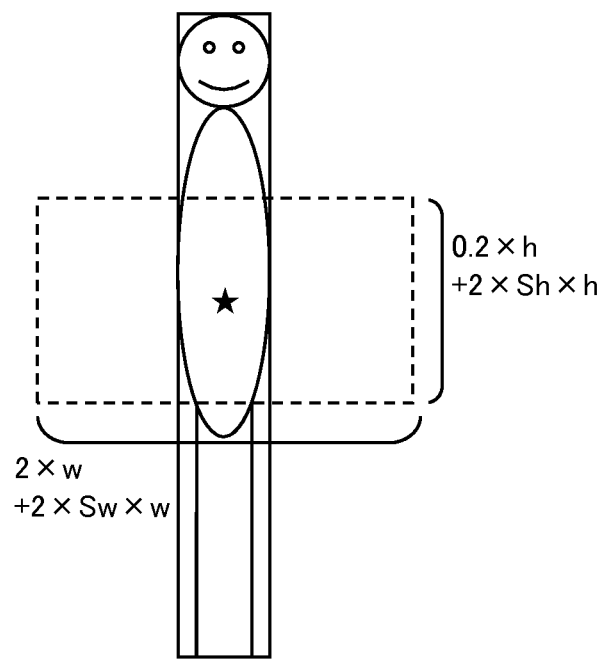
FIG. 19 shows an example of the search-target area in the case the search-target area type is "Hands".

FIG. 19 shows an example of the search-target area (the rectangular area in dotted line) corresponding to the human area (the rectangular area in solid line) when the search-target area type is "Hands". In this example, the search-target area is a rectangular area having a width of 2×w+2×Sw×w and a height of 0.2×h+2×Sh×h with the gravity center matching with the gravity center of the human area (the star sign in the figure). The terms "2×w" and "0.2×h" serve to define the search-target area encompassing the range of the movement of the hands.

The terms "2×Sw×w" and "2×Sh×h" means that the search-target area changes according to the size of the object. As shown in FIG. 19, the displacement (dX,dY) from the top-left point of the human area to the top-left point of the search-target area is represented by (−w−Sw×w,0.4h−Sh×h).

Thus, in order to define the search-target area having the gravity center matching with the gravity center of the human area and covering the range of the movement of the hands, the search-target area parameters for "Hands" are set as follows: α1=−1, α2=−1, β1=0.4, β2=−1, γ1=2, γ2=2, δ1=0.2, δ2=2 (See the first row in FIG. 14).

(2) Feet

Figure 20:
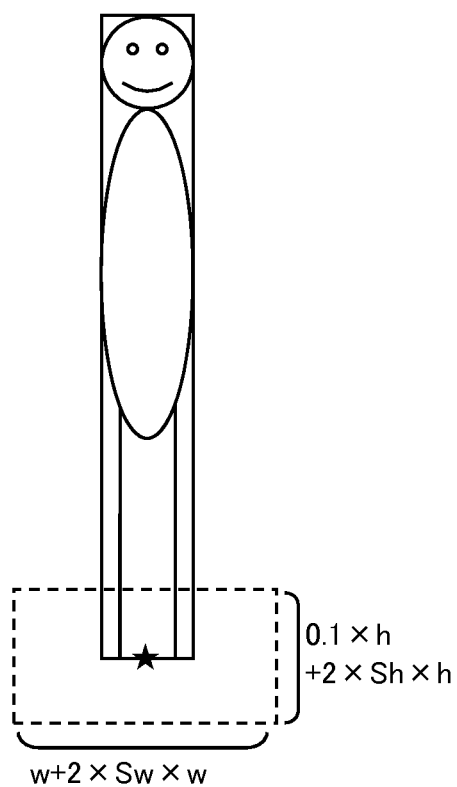
FIG. 20 shows an example of the search-target area in the case the search-target area type is "Feet".

FIG. 20 shows an example of the search-target area (the rectangular area in dotted line) corresponding to the human area (the rectangular area in solid line) when the search-target area type is "Feet". In this example, the search-target area is a rectangular area having a width of w+2×Sw×w and a height of 0.1×h+2×Sh×h with the center point matching with the center point of the human area (the star sign in the figure). The terms "w" and "0.1×h" serve to define the search-target area encompassing the range of the movement of the feet.

The terms "2×Sw×w" and "2×Sh×h" means that the search-target area changes in proportion to the size of the object. As shown in FIG. 20, the displacement from the top-left point of the human area to the top-left point of the search-target area is represented by (−Sw×w,0.95h−Sh×h).

Thus, in order to define the search-target area having the gravity center matching with the gravity center of the human area and covering the range of the movement of the feet, the search-target area parameters for "Feet" are set as follows: α1=0, α2=−1, β1=0.95, β2=−1, γ1=1, γ2=2, δ1=0.1, δ2=2 (See the second row in FIG. 14).

(3) Immediate Left

Figure 21:
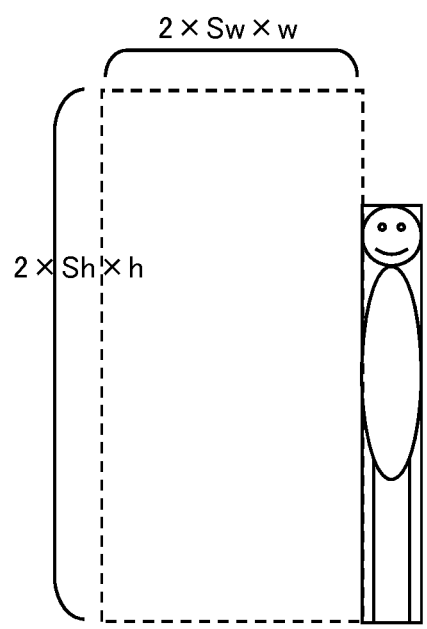
FIG. 21 shows an example of the search-target area in the case the search-target area type is "Immediate left".

FIG. 21 shows an example of the search-target area (the rectangular area in dotted line) corresponding to the human area (the rectangular area in solid line) when the search-target area type is "Immediate left". In this example, the search-target area is a rectangular area having a width of 2×Sw×w and a height of 2×Sh×h with the bottom-right point matching with the bottom-left point of the human area. In this example, there is no term for multiplying w and h by a constant, since the size of the search-target area does not depend on the size of the human area, and the search-target area changes depending only on the size of the object.

As shown in FIG. 21, the displacement from the top-left point of the human area to the top-left point of the search-target area is represented by (−2×Sw×w,h−2×Sh×h).

In order to define the width, the height and the displacement of the search-target area, the search-target area parameters for "Immediate left" are set as follows: α1=0, α2=−2, β1=0, β2=−2, γ1=0, γ2=2, δ1=0, δ2=2 (See the third row in FIG. 14).

(4) Immediate Right

Figure 22:
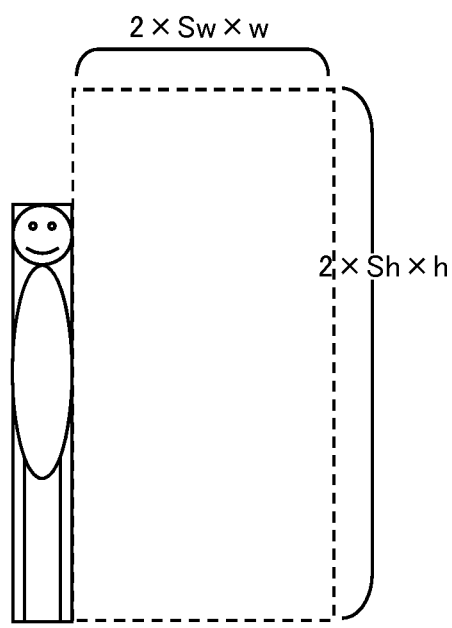
FIG. 22 shows an example of the search-target area in the case the search-target area type is "Immediate right".

FIG. 22 shows an example of the search-target area (the rectangular area in dotted line) corresponding to the human area (the rectangular area in solid line) when the search-target area type is "Immediate right". In this example, the search-target area is a rectangular area having a width of 2×Sw×w and a height of 2×Sh×h with the bottom-left point matching with the bottom-right point of the human area. In this example, there is no term for multiplying w and h by a constant, since the size of the search-target area does not depend on the size of the human area, and the search-target area changes depending only on the size of the object. As shown in FIG. 22, the displacement from the top-left point of the human area to the top-left point of the search-target area is represented by (w,h−2×Sh×h).

In order to define the width, the height and the displacement of the search-target area, the search-target area parameters for "Immediate right" are set as follows: $\alpha1=1$, $\alpha2=0$, $\beta1=0$, $\beta2=-2$, $\gamma1=0$, $\gamma2=2$, $\delta1=0$, $\delta2=2$ (See the forth row in FIG. 14).

Note that when part of the search-target area obtained in S504 lies off the edge of the image, the search-target area specifying unit 105 may define the search-target area only within the image, excluding the part. Furthermore, when the entire search-target area obtained in S504 lies off the edge of the image, the search-target area specifying unit 105 may exclude the search-target object selected in S501.

The following is a continuation of the exaptation for FIG. 5.

The search-target area specifying unit 105 associates the information about the search-target area specified in S504 with the search-target object ID of the search-target object, and writes them into the search-target area management information storage 128, as the search-target area management information 1501.

FIG. 15 shows an example of the search-target area management information 1501. In the example shown in FIG. 15, the coordinates of the top-left point, the width and the height of the rectangular search-target area are managed in association with the search-target object ID. In this example, the search-target area with the search-target object ID "11" has the top-left coordinates of (0,155), a width of 150 and a height of 140.

After Step S504, the search-target area specifying unit 105 determines whether the search-target area has been obtained from every search-target object (S505). If the search-target object specifying unit 104 has not obtained the search-target area for any of the search-target objects (No in S505), the search-target object specifying unit 104 returns to Step S501. In S505, if the search-target object specifying unit 104 has obtained the search-target area for every search-target object (Yes in S505), the search-target object specifying unit 104 finishes Step S205.

This completes the description in details of Step S205 shown in FIG. 2.

<Modifications to Search-Target Area Specifying Unit 105>

The following modifications (1) through (3) may be applied to the search-target area specifying unit 105.

(1) In the description above, the search-target area specifying unit 105 obtains the search-target area based on the search-target area type from the human area information. However, the present invention is not limited in this way. If it is possible to directly detect the part indicated by the search-target area type, the search-target area specifying unit 105 may obtain the search-target area by using all or part of the information about the detected part. For example, when the search-target area type is "Hands", the search-target area of the search-target object may be obtained by first obtaining the hands area by the method discussed in "Hand Detection and Hand Shape Classification Based on Appearance Learning for Sign Language Recognition" written by Yamada, Matsuo, Shimada and Shirai, and then obtaining the search-target area around the hands based on the top-left coordinates, the width and the height of the hands area and the ratio to the search-target object.

(2) In the description above, the search-target area specifying unit 105 selects the search-target area type in S503 based on the type of the search-target object, and selects the search-target area parameters in S504 based on the search-target area type. However, the present invention is not limited in this way. The search-target area specifying unit 105 may directly select the search-target area parameters according to the type of the search-target object. If this is the case, the search-target area specifying unit 105 can specifying the search-target area directly corresponding to the type of the search-target object.

Specifically, the area value information storage 126a stores object/search-target area parameter information 1701 showing parameters indicating the positional relationship with the area occupied by the reference object for each of the search-target objects. The search-target area specifying unit 105 selects the search-target area parameters by using the object/search-target area parameter information 1701.

As shown in FIG. 17, the object/search-target area parameter information 1701 is similar to the information that can be obtained by merging the object/search-target area type correspondence information 1301 shown in FIG. 13 and the search-target area parameter information 1401 shown in FIG. 14. In the example shown in FIG. 17, the search-target area parameters corresponding to the search-target object "Bouquet" are $\alpha1=-0.25$, $\alpha2=-1$, $\beta1=0.4$, $\beta2=-1$, $\gamma1=1.5$, $\gamma2=2$, $\delta1=0.2$ and $\delta2=2$.

Figure 23:
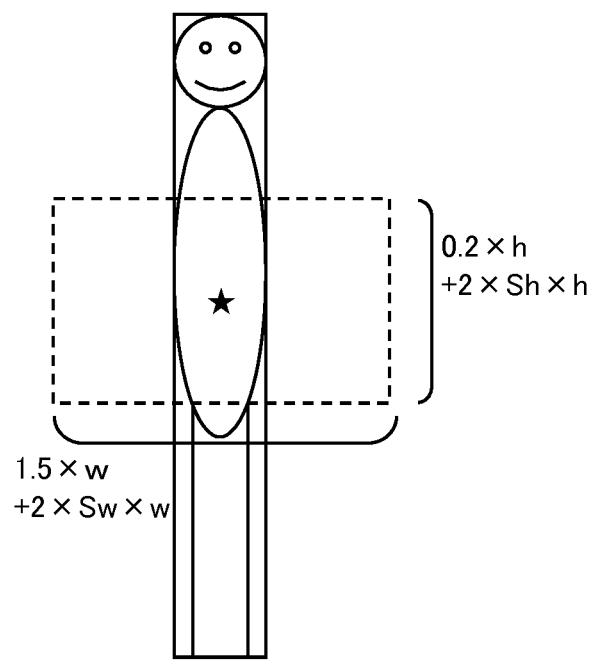
FIG. 23 shows an example of the search-target area in the case the search-target object is "Bouquet".

The following explains in detail the search-target area parameters for the case the human area and the search-target area are rectangular, with reference to the example shown in FIG. 23. FIG. 23 shows an example of the search-target area (the rectangular area in dotted line) corresponding to the human area (the rectangular in solid line) when the search-target object is "Bouquet". In this example, the search-target area is a rectangular having a width of 1.5×w+2×Sw×w and a height of 0.2×h+2×Sh×h with the gravity center matching with the gravity center of the human area (the star sign in the figure). The terms "1.5×w" and "0.2×h" serve to define the search-target area encompassing the range of the movement of the hands. The terms "2×Sw×w" and "2×Sh×h" means that the search-target area changes according to the size of the object. As shown in FIG. 19, the displacement (dX, dY) from the top-left point of the human area to the top-left point of the search-target area is represented by (−0.25×w−Sw×w,0.4h−Sh×h). In order to define the width, the height and the displacement of the search-target area, the search-target area parameters for "Hands" are set as follows: $\alpha1=-0.25$, $\alpha2=-1$, $\beta1=0.4$, $\beta2=-1$, $\gamma1=1.5$, $\gamma2=2$, $\delta=0.2$, $\delta2=2$ (See the first row in FIG. 17).

(3) In the description above, each object is assigned one search-target area type. However, the present invention is not limited in this way. When one object is assigned two or more search-target area types, the search-target area corresponding to the search-target object may be the sum of the search-target areas corresponding to the search-target area types. For example, in the case of the object/search-target area type correspondence information 1301 shown in FIG. 13, the sign for an entrance ceremony as the search-target object is assigned two search-target area types, namely "Immediate left" and "Immediate right". That is, when the search-target object is a sign for an entrance ceremony, the search-target area specifying unit 105 selects the search-target area parameters for each of "Immediate left" and "Immediate right" and obtains the search-target area for each, and defines the sum of the two search-target areas as the search-target area.

These modifications (1) through (3) may be applied to the search-target area specifying unit 105.

The following is a continuation of the explanation for FIG. 2. The object recognition unit 106 performs the recognition of the search-target object specified in S204 within the search-target area specified in S205. This process is performed with the use of the image management information 701, the search-target object management information 1101 and the search-target area management information 1501.

The following explains an example of Step S206 with reference to the flowchart shown in FIG. 6.

First, the object recognition unit 106 selects one search-target object ID from the search-target objects specified in S204 for each person captured in the image (S601). Specifically, the object recognition unit 106 selects a row including a search-target object ID from the table of the search-target object management information 1101 as shown in FIG. 11.

Next, the object recognition unit 106 obtains the image feature of the search-target area corresponding to the selected search-target object (S602). Specifically, the object recognition unit 106 specifies the search-target area corresponding to the selected search-target object ID by referring to the search-target area management information 1501, and obtains the image feature of the specified search-target area.

Then, the object recognition unit 106 performs the recognition of the search-target object based on the image feature obtained in S602 (S603). For example, when the classification by machine learning using an SVM is adopted, the object recognition unit 106 obtains the likelihood showing the accuracy of the classification of the object by using the image feature, an SVM classifier, and learning models obtained beforehand. The object recognition unit 106 determines whether the object exists in the search-target area based on whether the likelihood is greater than a predetermined threshold.

After S603, the object recognition unit 106 determines whether the object recognition has been completed for every search-target object (S604). If the object recognition has not been completed for any of the search-target objects (No in S604), the object recognition unit 106 returns to Step S601. In S604, if the object recognition has been completed for every search-target object (Yes in S604), the object recognition unit 106 finishes Step S206.

Thus the object recognition unit 106 performs the object recognition for every search-target object, associates the results of the recognition with the search-target object ID of each search-target object, and then writes them into the object recognition management information storage 129, as the object recognition management information 1601.

FIG. 16 shows an example of the object recognition management information 1601. In the example shown in FIG. 16, each search-target object ID is associated with the result of the object recognition, which is represented by "Yes" or "No". In this example, the object recognition management information 1601 shows that the result of the recognition of the object with the search-target object ID "11" is "Yes", that is, the object with the object ID "11" has been successfully recognized. Regarding the object with the search-target object ID "12", the object recognition management information 1601 shows that the result of the recognition is "No", that is, the object with the object ID "12" has not been successfully recognized.

This concludes the explanation for the structure of the image recognition device pertaining to Embodiment 1 and the processing procedures performed by the image recognition device. The following explains specific examples of the operations performed by the image recognition device pertaining to Embodiment 1.

<Example Operations Performed by Embodiment 1>

Figure 24:
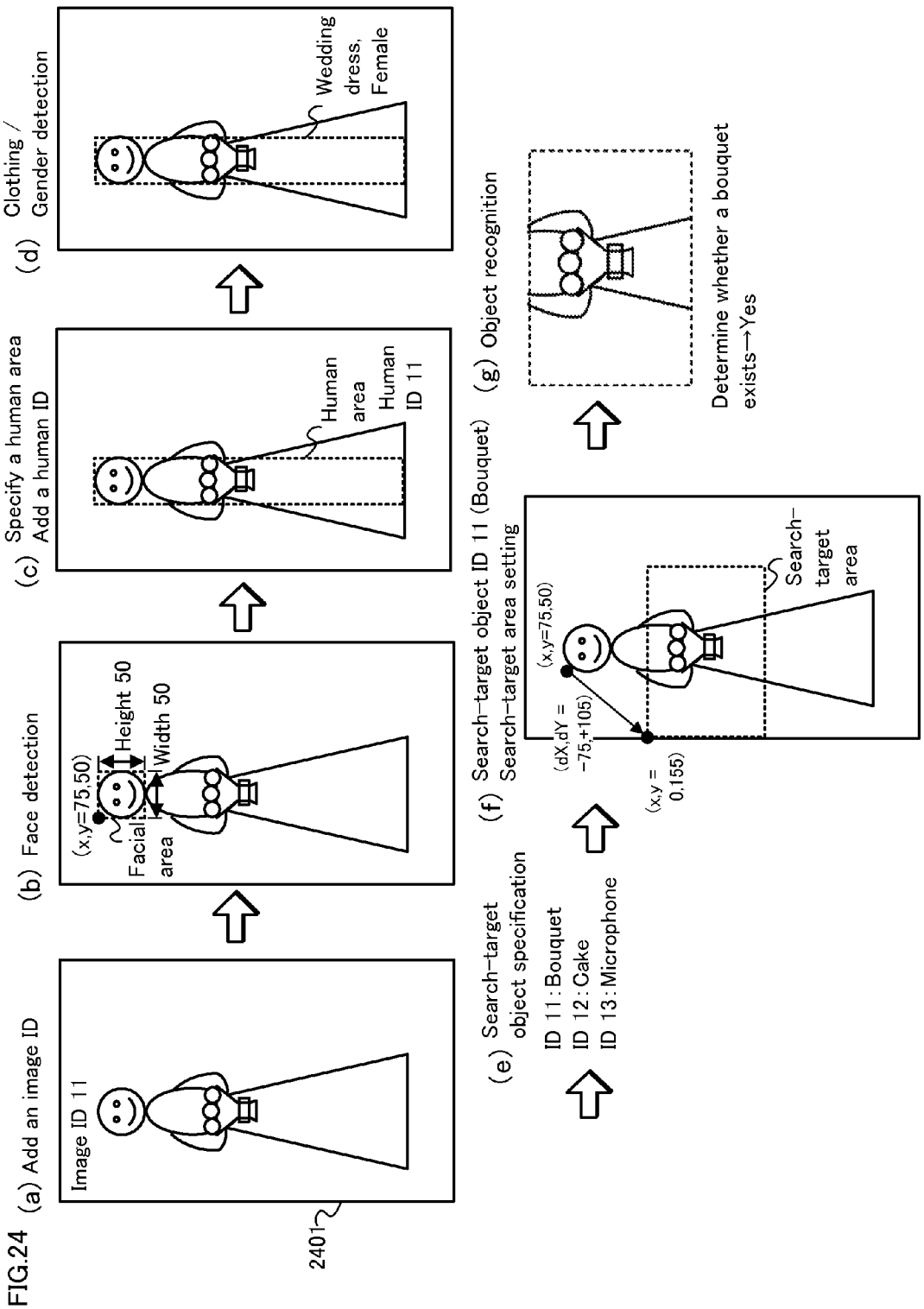
FIG. 24 shows an example of an input image pertaining to Embodiment 1.

The following specifically explains the series of operations performed by the image recognition device 100 to specify the search-target object and the search-target area and recognize the object, with reference to the flowchart shown in FIG. 2 and FIG. 24. The image 2401 shown in FIG. 24 is a picture of a woman wearing a wedding dress with a bouquet in her hand.

First, as shown in Step (a) in FIG. 24, the image acquiring unit 101 acquires the image 2401 (S201). Next, the image acquiring unit 101 adds the image ID "11" to the image 2401 thus acquired, and writes them into the image management information storage 120, as the image management information 701. The image management information of the image 2401 is managed as shown in the first row of the table shown in FIG. 7 (as the image with the image ID "11").

Next, as shown in Step (b) in FIG. 24, the reference object detecting unit 102 detects a person from the input image (S202). First, the reference object detecting unit 102 detects the face. Suppose that the coordinates (x,y) of the top-left point of the facial area are (x,y)=(75,50), the width is 50 pixels, and the height is 50 pixels. If this is the case, as shown in Step (c) in FIG. 24, the reference object detecting unit 102 defines, as the human area, the sum of the facial area and a rectangular area six times the facial area arranged immediately below the facial area, in the same manner as shown in FIG. 18. That is, the human area will be the area with the top-left coordinates (x,y)=(75,50), having a width of 50 pixels and a height of 350 pixels. The reference object detecting unit 102 adds the human ID "11" to the detected person, and writes the human ID into the human area management information 801 together with the position and the size of the human area. Since one person has been detected as the reference object from the image 2401, the human area management information of the image 2401 is managed as shown in FIG. 8.

Next, as shown in Step (d) in FIG. 24, the attribute obtaining unit 103 obtains the attributes of the person with the human ID "11" (S203). The following explains a specific example of Step S203, with reference to the flowchart shown in FIG. 3. The attribute obtaining unit 103 selects the human ID "11" from the human area management information 801 (S301). Then, the attribute obtaining unit 103 determines that the clothing corresponding to the human ID "11" is "Wedding dress" (S302). Subsequently, the attribute obtaining unit 103 determines that the gender corresponding to the human ID "11" is "Female" (S303). Finally, the attribute obtaining unit 103 determines that the attribute determination has been completed for all the people (Yes in S304), and finishes Step S203. The attributes "Wedding dress" and "Female" thus obtained are managed as shown in the first row of the attribute management information 901 (associated with the human ID "11") shown in FIG. 9.

Next, as shown in Step (e) in FIG. 24, the search-target object specifying unit 104 specifies the search-target object (S204). The following explains a specific example of Step S204, with reference to the flowchart shown in FIG. 4. The search-target object specifying unit 104 selects the human ID "11" and the attributes "Wedding dress" and "Female" corresponding to the human ID "11" from the information managed in the attribute management information storage 122 (S401). After that, the search-target object specifying unit 104 refers to the attribute/object correspondence information 1001, and specifies "Bouquet", "Cake" and "Microphone" as the search-target object associated with the attributes "Wedding dress" and "Female". The search-target object specifying unit 104 adds search-target object IDs "11", "12" and "13" to these search-target objects, and writes them together with the human ID "11" into the search-target object management information storage 124, as the search-target object management information 1101. Next, the search-target object specifying unit 104 determines that the selection of the search-target objects has been completed for every person (Yes in S403), and finishes Step S204. The information about the search-target objects "Bouquet", "Cake" and "Microphone" thus detected is managed as shown in the first, the second and the third row of the search-target object management information 1101 shown in FIG. 11 (the search-target objects with the search-target object IDs "11", "12" and "13").

Next, as shown in Step (f) in FIG. 24, the search-target area specifying unit 105 specifies the search-target area (S205). The following explains a specific example of Step S205, with reference to the flowchart shown in FIG. 5. First, the search-target area specifying unit 105 selects the row consisting of the search-target object ID "11", the human ID "11" and the search-target object "Bouquet" from the search-target object management information 1101 (S501). Subsequently, the search-target area specifying unit 105 refers to the object/size correspondence information 1201 and specifies Sw=0.5 as the ratio of the width of "Bouquet" to the width of the person and Sh=0.1 as the ratio of the height of the "Bouquet" to the height of the person (S502). After that, the search-target area specifying unit 105 refers to the object/search-target area type correspondence information 1301, and selects "Hands" as the search-target area type associated with "Bouquet" (S503). In S504, the search-target area specifying unit 105 refers to the search-target area parameter information 1401, and selects α1=−1, α2=−1, β1=0.4, β2=−1, γ1=2, γ2=2, δ1=0.2 and δ2=2 as the search-target area parameters associated with the search-target area type "Hands". From Formula 1, Formula 2, Formula 3, Formula 4 and the search-target area parameters, the search-target area of "Bouquet" can be obtained by the following Formula 5, Formula 6, Formula 7 and Formula 8:

$$dX=-w-Sw\times w \qquad \text{(Formula 5)}$$

$$dY=0.4\times h-Sh\times h \qquad \text{(Formula 6)}$$

$$W=2\times w+2\times Sw\times w \qquad \text{(Formula 7)}$$

$$H=0.2\times h+2\times Sh\times h \qquad \text{(Formula 8)}$$

Here, from the human area management information 801, the search-target area specifying unit 105 specifies the top-left coordinates (x,y)=(75,50), the width w=50 and the height h=350 as the human area corresponding to the human ID "11". Therefore, from Formula 5, Formula 6, Formula 7 and Formula 8, the search-target area specifying unit 105 obtains dX=−75, dY=105, W=150 and H=140. That is, the search-target area specifying unit 105 obtains, as the search-target area for "Bouquet", a rectangular area with the top-left coordinates (0,155), a width of 150 and a height of 140. After specifying the search-target area for the search-target object with the search-target object ID "11" (i.e. Bouquet)(No in S505), the search-target area specifying unit 105 performs Steps S501 through S504 for the search-target object with the search-target object ID "12" (i.e. Cake) and the search-target object with the search-target object ID "13" (i.e. Microphone) in the same manner and obtains their respective search-target areas. After obtaining the search-target area for every search-target object, (Yes in S505), the search-target area specifying unit 105 finishes Step S205. The search-target area information thus obtained are associated with the search-target object ID and managed as the search-target area management information 1501. For example, such information about the image 2401 is managed as shown in the first, the second and the third row in FIG. 15 (i.e. the search-target objects with the search-target object IDs "11", "12" and "13").

Then, the object recognition unit 106 performs the object recognition (S206). The following explains a specific example of Step S206 with reference to the flowchart shown in FIG. 6. First, the object recognition unit 106 selects the row consisting of the search-target object ID "11", the human ID "11" and the search-target object "Bouquet" from the search-target object management information 1101 (S601). Next, the object recognition unit 106 specifies the search-target area corresponding to the search-target object ID "11" from the search-target area management information 1501, and obtains the image feature of the specified area (S602). Then, using the image feature obtained in S602, the object recognition unit 106 determines whether "Bouquet" is contained in the search-target area by using the SVM (S603). Step (g) in FIG. 24 represents the object recognition performed for "Bouquet".

After that, the object recognition unit 106 performs the object recognition for the search-target objects indicated by the search-target object IDs "12" and "13" in the same manner. The results of the object recognition are associated with the search-target object IDs and managed as the object recognition management information 1601. When determining that the object recognition has been completed for every search-target object (Yes in S604), the object recognition unit 106 finishes Step S206. In the example shown in FIG. 16, the results of the object recognition performed as described above are managed as shown in the first, the second and the third row (i.e. the search-target objects with the search-target object IDs "11", "12" and "13").

In this specific example, the search-target object is specified as "Bouquet", etc. according to attributes "Wedding dress" and "Female" of the person. Thus, the search-target object is specified as the object matching with the attributes "Wedding dress" and "Female", and other objects not matching with these attributes can be excluded from the search target. This improves the accuracy of the object recognition. Moreover, the load of the object recognition is reduced.

Furthermore, since the search-target area is limited to the area around the hands of the female, where "Bouquet" is expected to exist, other objects that have similar image feature to "Bouquet" can be excluded from the search-target area, and this prevents misrecognition and leads to the improvement of the recognition accuracy.

As described above, the image recognition device 100 pertaining to Embodiment 1 limits the search-target object and the search-target area according to the attributes of the person, and thus recognizes the object related to the attributes of the person with improved accuracy. Also, the image recognition device 100 prevents misrecognition of objects belonging to a person not related to objects to be searched or objects that are in the background and have a similar image feature to the object to be searched.

The image recognition device pertaining to Embodiment 1 is typically used for classifying the scenes where images were captured. For example, suppose the case where the image recognition device pertaining to Embodiment 1 detects "Female" wearing "Wedding dress" as the attributes of the reference object of an image. According to this result of detection, the image can be classified as an image captured in a wedding party. Furthermore, suppose that "Cake", which can co-occur with the reference object (i.e. appear in a same image). According to this result of detection, the image can be classified as an image captured during the cake cutting in a wedding ceremony.

Embodiment 2

According to Embodiment 1, the search-target object and the search-target area are selected based on the attributes of a single reference object. However, the attributes of a plurality of reference objects may be used for the selection. It is possible to specify the object that can exist in the image and the area where the object can exist based on the relationship with the attributes of the reference objects. For example, when a plurality of reference objects arranged in a horizontal direction are detected from an image, and the gap between adjacent two of the reference objects is larger than the gap between other adjacent two, it can be expected that the search-target object exists between the former adjacent two of the reference objects with the larger gap.

The image recognition device pertaining to Embodiment 2 performs the image recognition based on such a concept.

<Structure>

The following describes an image recognition device pertaining to Embodiment 2. In the following, the image recognition device specifies the search-target object and the search-target area by using the attribute of a plurality of reference objects obtained by the attribute obtaining unit 103.

Figure 25:
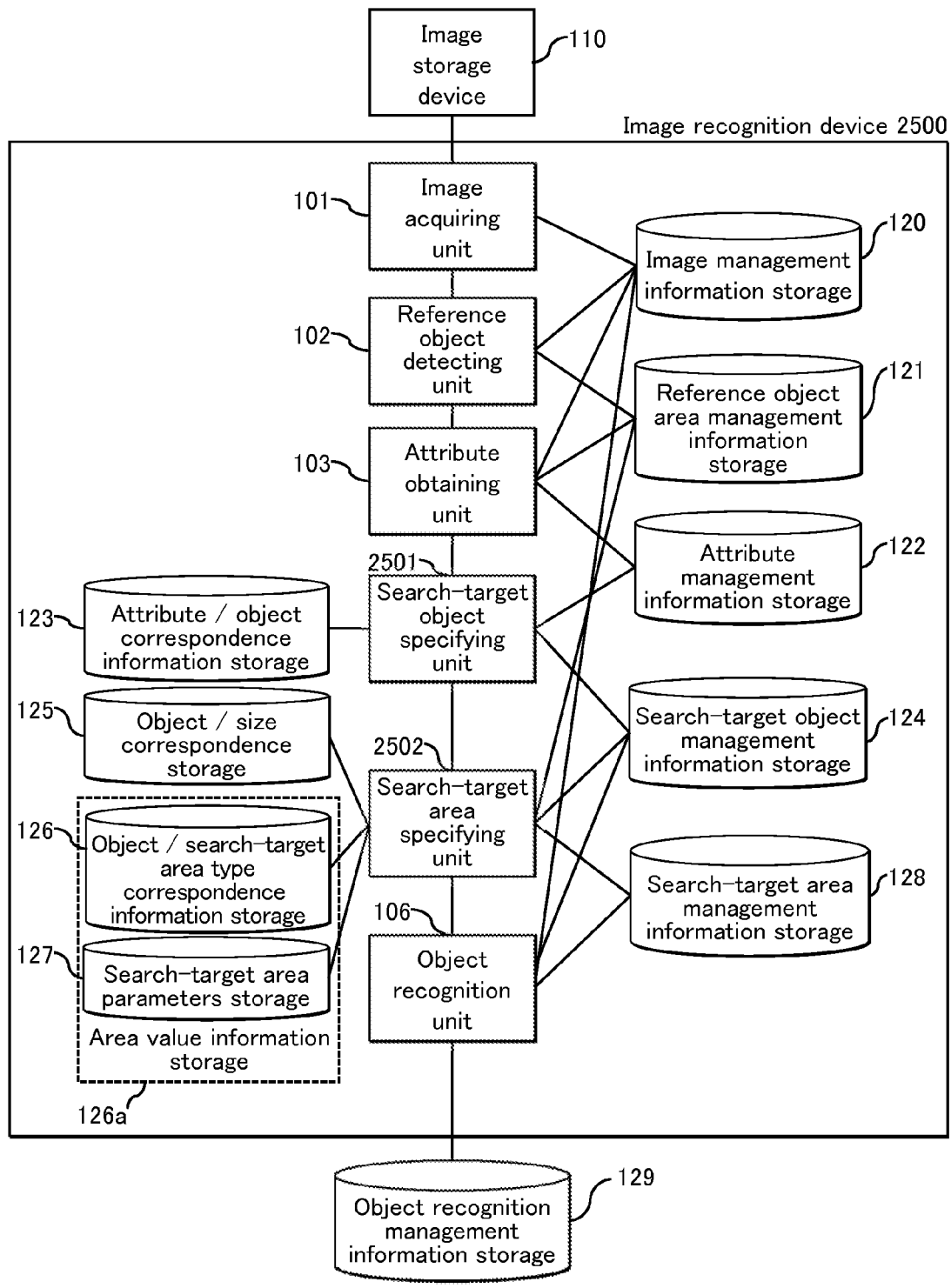
FIG. 25 is a functional block diagram of an image recognition device 2500 pertaining to Embodiment 2.

FIG. 25 is a functional block diagram of an image recognition device 2500 pertaining to Embodiment 2. The structure of the image recognition device 2500 is different from the image recognition device 100 shown in FIG. 1 in the internal operations of the search-target object specifying unit and the search-target area specifying unit. The following explains the search-target object specifying unit 2501 and the search-target area specifying unit 2502 which are the differences from Embodiment 1.

The search-target object specifying unit 2501 specifies the search-target object based on information about the areas of the reference objects obtained by the reference object detecting unit 102 and the attributes of the reference objects obtained by the attribute obtaining unit 103.

The search-target area specifying unit 2502 specifies relative search-target area types of the reference objects associated with the search-target object based on information about the areas of the reference objects and information about the search-target object specified by the search-target object specifying unit 2501, and obtains the search-target area.

<Operations>

Next, description is given to the operations performed by the image recognition device 2500. The operations of the image recognition device 2500 are basically similar to those shown in FIG. 2. However, since the search-target object specifying unit 2501 and the search-target area specifying unit 2502 operate differently from Embodiment 1, specific operations performed in S204 and S205 in FIG. 2 are different from Embodiment 1. The following mainly describes these differences.

Figure 26:
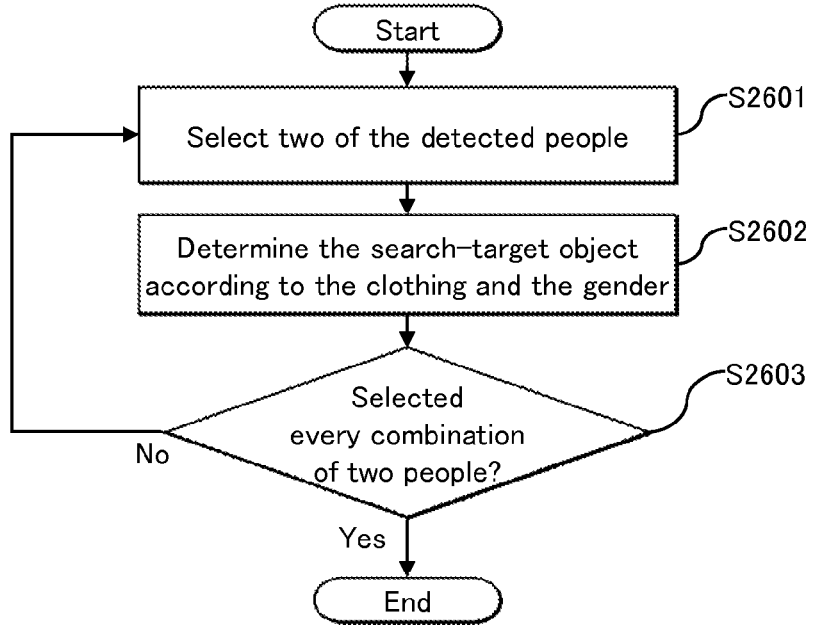
FIG. 26 is a flowchart showing an example of processing procedures pertaining to Embodiment 2 performed for specifying a search-target object.

FIG. 26 is a flowchart showing example operations performed by search-target object specifying unit 2501 of Embodiment 2. In the following example, it is assumed that reference objects are people, and the number of people is two.

First, the search-target object specifying unit 2501 selects two human IDs from among the human IDs of the people detected by the attribute obtaining unit 103 (S2601). Specifically, the search-target object specifying unit 2501 selects two rows corresponding to two human IDs detected from an image, from the table of the attribute management information shown in FIG. 9.

Next, the search-target object specifying unit 2501 specifies the search-target objects based on the attributes and the information about the human areas corresponding to the selected two human IDs (S2602). The search-target object specifying unit 2501 specifies the search-target object by, for example, selecting the search-target object matching the attributes corresponding to the selected human IDs (two IDs in this example) by using the attribute/object correspondence information 2801, which shows the relationship between the attributes and information about the human areas and the search-target object. The attribute/object correspondence information 2801 is stored in the attribute/object correspondence information storage 123.

FIG. 28 shows an example of the attribute/object correspondence information 2801. In the example shown in FIG. 28, candidates for the search-target object and the distances between the corresponding two people are managed in association with the attributes, namely the clothing and the gender, of each person. This example shows that "Wedding cake" is specified as the search-target object when the distance between "Female" wearing "Wedding dress" and "Male" wearing "Suit" represented by the difference between the X coordinates of the top-left points of their respective human areas is not greater than 0.3 times the sum of the widths of the human areas.

Note that the order of the first and the second person in the attribute/object correspondence information 2801 may be opposite the order of the two human IDs selected in S2601.

The search-target object specifying unit 2501 associates each of the specified search-target objects with a unique search-target object ID, and writes them into the search-target object management information storage 124, as the search-target object management information 2901.

FIG. 29 shows an example of the search-target object management information 2901. In the example shown in FIG. 29, the human IDs and the search-target objects are managed in association with the search-target object IDs. This example shows that the object with the search-target object ID "21" is the object corresponding to the human IDs "21" and "22", and that the search-target object is "Sign for entrance ceremony".

After Step S2602, the search-target object specifying unit 2501 determines whether the search-target objects have been specified for every combination of two people contained in the image (S2603). If the search-target object specifying unit 2501 has not specified the search-target objects for any pair of people (No in S2603), the search-target object specifying unit 2501 returns to Step S2601. In S2603, if the search-target object specifying unit 2501 has specified the search-target objects for every pair- of people in the image (Yes in S2603), the search-target object specifying unit 2501 finishes the processing.

Figure 27:
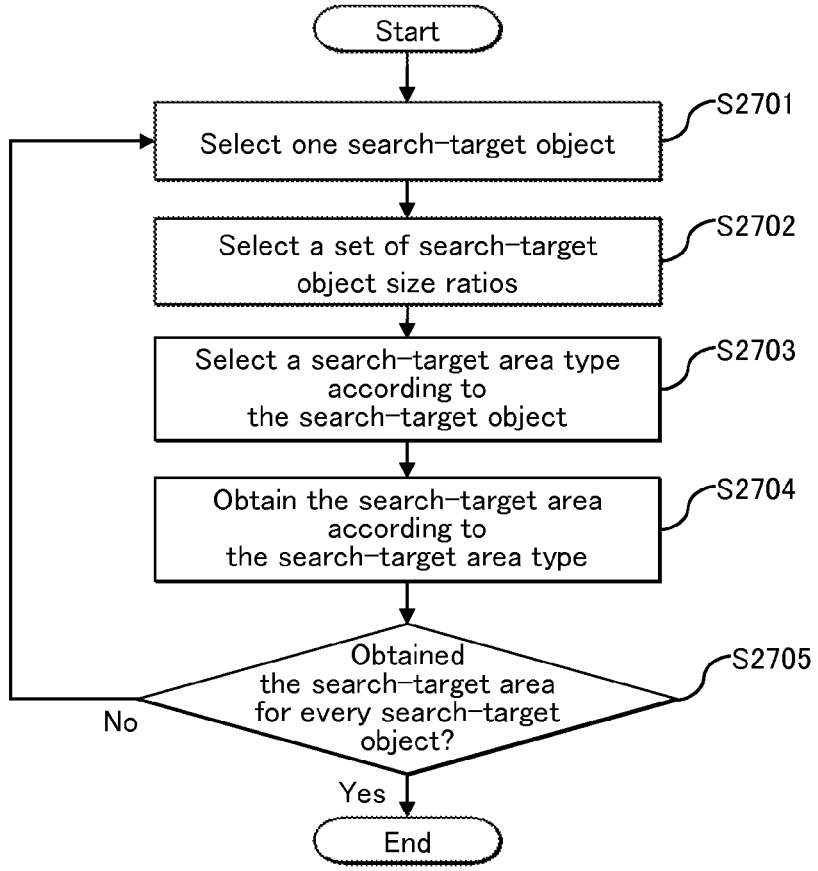
FIG. 27 is a flowchart showing an example of processing procedures pertaining to Embodiment 2 performed for specifying a search-target area.

The following explains example operations performed by the search-target area specifying unit 2502 pertaining to the present embodiment with reference to the flowchart shown in FIG. 27.

First, in S204, the search-target area specifying unit 2502 selects one search-target object ID from among the search-target object IDs specified for the pairs of people detected from the image (S2701). Specifically, the search-target area specifying unit 2502 selects a row including a search-target object ID from the table of the search-target object management information 2901 as shown in FIG. 29.

Next, the search-target area specifying unit 2502 selects the search-target object size ratios for the search-target object corresponding to the selected search-target object ID (S2702). Note that the search-target object size ratios are the same as described above for Embodiment 1. The search-target area specifying unit 2502 specifies the search-target object size ratios by, for example, selecting the search-target object size ratios matching the selected search-target object ID from the object/size correspondence information 3001 showing the relationship between the search-target object and the search-target object size ratios.

FIG. 30 shows an example of the object/size correspondence information 3001. In the example shown in FIG. 30, the ratios of the widths and the heights of the search-target objects to the width and the height of a person are managed in association with the search-target objects. This example shows that the width of "Wedding cake" is 0.5 times the width of a person, and the height of "Wedding cake" is 0.1 times the height of a person.

Next, the search-target area specifying unit 2502 selects a search-target area type for the search-target object corresponding to the selected search-target object ID (S2703). Here, the search-target area type shows the type of a particular area suggesting the existence of the search-target object, in terms of the relative position to the plurality of reference objects. Examples of the search-target area type include "In front of two people" and "Between two people". The search-target area specifying unit 2502 specifies the search-target area type by, for example, selecting the search-target area type matching with the search-target object by using the object/search-target area type correspondence information 3101 stored in the object/search-target area type correspondence information storage 126.

FIG. 31 shows an example of object/search-target area type correspondence information 3101. In the example shown in FIG. 31, the search-target area types are managed in association with the search-target objects. In this example, the search-target area type corresponding to "Wedding cake" is "In front of two people".

The search-target area type thus selected is used for obtaining the search-target area in S2704, which will be described later.

Next, the search-target area specifying unit 2502 obtains the position and the size of the search-target area corresponding to the specified search-target object (S2704). The search-target area is obtained by size change and/or parallel displacement of the area specified based on the human areas of the plurality of people. For example, when the human areas are rectangular, the search-target area specifying unit 2502 specifies the search-target area by substituting parameters into search-target area formulas. The parameters are obtained from the search-target area parameter information stored in the search-target area parameter storage 127 and information about the human area indicated by the selected human ID. Here, the search-target area formulas are used for obtaining the average of the top-left coordinates of the human areas, and obtaining the rectangular search-target area by size change and/or parallel displacement of the area having the top-left point at the average of the top-left coordinates thus obtained.

In the following example, a simple average is used as the average. However, a weighted average based for example on the size of the human area, the degree of importance of the human ID may be used instead.

The search-target area formulas consist for example of: a formula for obtaining a displacement from the midpoint between the respective top-left points of the human areas of the two people to the top-left point of the search-target area; a formula for obtaining the width of the search-target area; and a formula for obtaining the height of the search-target area. When the displacement from the midpoint of the respective top-left points of the human areas of the two people to the top-left point of the search-target area is represented by coordinates (dX,dY) and the width and the height of the search-target area are represented by W and H respectively, dX, dY, W and H can be represented by the following formulas, for example.

$$dX = \alpha 1 \times w0 + \alpha 2 \times Sw \times w0 \quad \text{(Formula 9)}$$

$$dY = \beta 1 \times h0 + \beta 2 \times Sh \times h0 \quad \text{(Formula 10)}$$

$$W = \gamma 1 \times w0 + \gamma 2 \times Sw \times w0 \quad \text{(Formula 11)}$$

$$H = \delta 1 \times h0 + \delta 2 \times Sh \times h0 \quad \text{(Formula 12)}$$

Here, w0 denotes the average of the widths of the human areas for the two people, and h0 denotes the average of the heights of the human areas for the two people. These values are obtained by selecting two rows including the selected human IDs from the table of the human area management information 801. Sw denotes the ratio of the width of the search-target object to the width of the human area, and Sh denotes the ratio of the height of the search-target object to the height of the person. These values are obtained in S2702. $\alpha 1$, $\alpha 2$, $\beta 1$, $\beta 2$, $\gamma 1$, $\gamma 2$, $\delta 1$ and $\delta 2$ denote parameters determined by the search-target area type. Specifically: $\alpha 1$ and $\alpha 2$ respectively denote the degree of contribution of the width of the human area to dX and the degree of contribution of the width of the search-target object to dX; $\beta 1$ and $\beta 2$ respectively denote the degree of contribution of the height of the human area to dY and the degree of contribution of the height of the search-target object to dY; $\gamma 1$ and $\gamma 2$ respectively denote the degree of contribution of the width of the human area to the width of the search-target area and the degree of contribution of the width of the search-target object to the width of the search-target area; and $\delta 1$ and $\delta 2$ respectively denotes the degree of contribution of the height of the human area to the height of the search-target area and the degree of contribution of the height of the search-target object to the search-target area. The search-target area specifying unit 2502 selects the search-target area parameters matching with the search-target area type by, for example, using the search-target area parameter information 3201 stored in the search-target area parameter storage 127.

In the present embodiment, in order to obtain the position and the size of the search-target area by the above-described method, the type of the relative search-target area for the two people and the coefficients of the search-target area formulas 9 through 12 are associated with each other, and stored in the search-target area parameters storage 127, as the search-target area parameter information 3201.

FIG. 32 shows an example of the search-target area parameter information 3201. In the example shown in FIG. 32, the coefficients for the search-target area formulas are managed in association with the search-target area type.

The following explains in detail the search-target area parameters for the case the human area and the search-target area are rectangular, with reference to the example shown in FIG. 33 and FIG. 34. FIG. 33 shows an example of the search-target area (the rectangular area in dotted line) corresponding to the human area (the rectangular area in solid line) when the search-target area type is "In front of two people". In this example, the search-target area is a rectangular area having a width of 2×w0+2×Sw×w0 and a height of 0.2×h0+2× Sh×h0. The terms "2×w0" and "0.2×h0" mean that the search-target area changes according to the change of the position of the body parts such as hands within the area with a width of 2×w0 and a height of 0.2×h0. The terms "2×Sw× w0" and "2×Sh×h0" mean that the search-target area changes according to the size of the object. In FIG. 33, the displacement from the midpoint of the top-left points of the human areas of the two people to the top-left point of the search-target area is represented by (−0.5×w0−Sw×w0, 0.4×h0−Sh× h0).

These search-target area parameters $\alpha 1 = -0.5$, $\alpha 2 = -1$, $\beta 1 = 0.4$, $\beta 2 = -1$, $\gamma 1 = 2$, $\gamma 2 = 2$, $\delta 1 = 0.2$ and $\delta 2 = 2$ (See the first row in FIG. 32) are set so that the midpoint between the gravity centers of the human areas of the two people (the star sign in the figure) matches the gravity center of the search-target area to be obtained.

FIG. 34 shows an example of the search-target area (the rectangular area in dotted line) corresponding to the human area (the rectangular area in solid line) when the search-target area type is "Between two people". In this example, the search-target area is a rectangular area whose bottom side has the midpoint at P0 and having a width of 2×Sw×w0 and a height of 2×Sh×h0. Here, when P1 and P2 denote the midpoints of the bottom sides of the human areas of the two people, P0 is the midpoint between P1 and P2. In this example, there is no term for multiplying w0 and h0 by a constant, since the size of the search-target area does not depend on the size of the human areas, and the search-target area changes depending only on the size of the object. In FIG. 34, since the midpoints of the bottom sides matches P0, the displacement from the midpoint of the top-left points of the human areas of the two people to the top-left point of the search-target area is represented by (0.5×w0−Sw×w0, h0−Sh×h0). The search-target area parameters used for setting the search-target area are $\alpha1=0.5$, $\alpha2=-1$, $\beta1=1$, $\beta2=-1$, $\gamma1=0$, $\gamma2=2$, $\delta1=0$ and $\delta2=2$ (See the second row in FIG. 32).

The following is a continuation of the exaptation for FIG. 27.

The search-target area specifying unit 2502 associates the information about the search-target area specified in S2704 with the search-target object ID of the search-target object, and writes them into the search-target area management information storage 128, as the search-target area management information 1501. Note that the search-target area management information 1501 is stored in the search-target area management information storage 128 in the same format as shown in FIG. 15, for example.

After Step S2704, the search-target area specifying unit 2502 determines whether the search-target area has been obtained from every search-target object (S2705). If the search-target object specifying unit 2502 has not obtained the search-target area for any of the search-target objects (No in S2705), the search-target object specifying unit 2502 returns to Step S2701. In S2705, if the search-target object specifying unit 2502 has obtained the search-target area for every search-target object (Yes in S2705), the search-target object specifying unit 2502 finishes the processing.

This concludes the explanation for the structure of the image recognition device pertaining to Embodiment 2 and the processing procedures performed by the image recognition device. The following explains specific examples of the operations performed by the image recognition device pertaining to Embodiment 2.

<Example Operations Performed by Embodiment 2>

Figure 35:
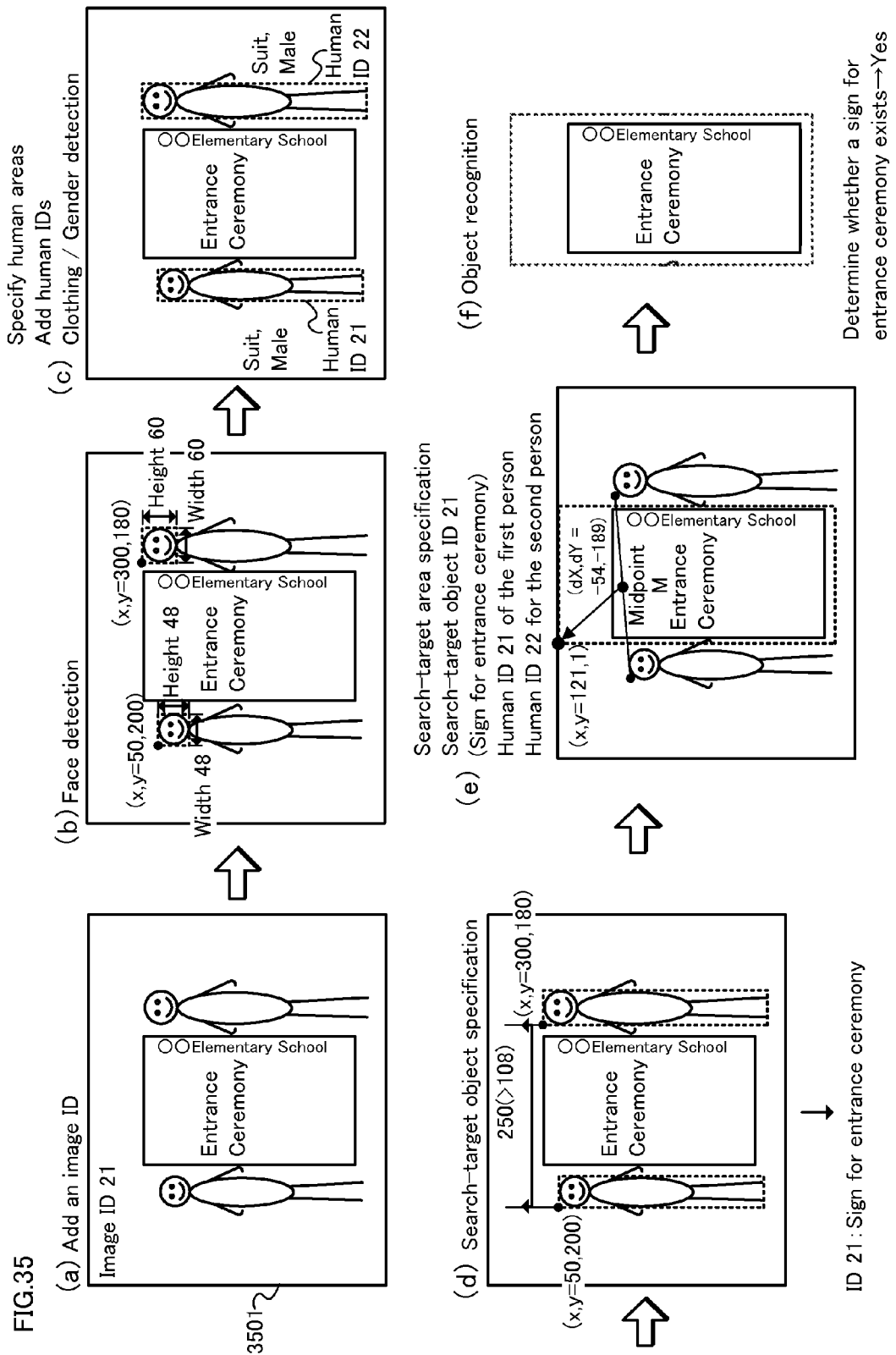
FIG. 35 shows an example of an input image pertaining to Embodiment 2.

The following specifically explains the series of operations performed by the image recognition device 2500 to specify the search-target object and the search-target area and recognize the object in the image 3501 shown in FIG. 35, with reference to the flowchart shown in FIG. 2 and FIG. 35. The image 3501 shown in FIG. 35 is a picture in which two boys wearing a suit and a Sign for entrance ceremony between them are captured.

First, as shown in Step (a) in FIG. 35, the image acquiring unit 101 acquires the image 3501 (S201). Next, the image acquiring unit 101 adds the image ID "21" to the image thus acquired, and manages them as the image management information 701. The information of the image 3501 is managed as shown in the second row of the table shown in FIG. 7 (as the image with the image ID "21").

Next, the reference object detecting unit 102 detects people from the input image (S202). First, the reference object detecting unit 102 detects the faces as shown in Step (b) in FIG. 35. Suppose that the coordinates (x,y) of the top-left point of the facial area of the first person are (x,y)=(50,200), the width is 48 pixels, and the height is 48 pixels, and the coordinates (x,y) of the top-left point of the facial area of the second person are (x,y)=(300,180), the width is 60 pixels, and the height is 60 pixels. If this is the case, the reference object detecting unit 102 defines, as the human area for each person, the sum of the facial area and a rectangular area six times the facial area arranged immediately below the facial area, in the same manner as shown in FIG. 18. That is, the human area for the first person will be the area with the top-left coordinates (x,y)=(50,200), a width of 48 pixels and a height of 336 pixels, and the human area for the second person will be the area with the top-left coordinates (x,y)=(300,180), a width of 60 pixels and a height of 420 pixels. As shown in Step (c) in FIG. 35, the reference object detecting unit 102 adds human IDs "21" and "22" in this order to the detected people, and writes them into the human area management information 801 together with the information about the human areas. The information about the people is managed as shown in the second and the third row of the table shown in FIG. 8 (as the people with the human IDs "21" and "22").

Next, the attribute obtaining unit 103 obtains the attributes of the people (S203). The following explains a specific example of Step S203 with reference to the flowchart shown in FIG. 3. First, the attribute obtaining unit 103 selects the human ID "21" from the human area management information 801 (S301). Next, the attribute obtaining unit 103 determines that the clothing of the person with the human ID "21" is "Suit" and the gender of the person is "Male" (S302, S303). As a result, the attributes "Suit" and "Male" are written into the attribute management information 901 in association with the human ID "21". Since the attributes of the person with the human ID "22" have not be obtained, the attribute obtaining unit 103 determines negatively ("No") in S304, and returns to S301. Next, in S301, the attribute obtaining unit 103 selects the human ID "22" from the human area management information 801. In S302, the attribute obtaining unit 103 determines that the clothing of the person with the human ID "22" is "Suit" and in S303, determines that the gender of the person is "Male". As a result, the attributes "Suit" and "Male" are written into the attribute management information 901 in association with the human ID "22". In S304, the attribute obtaining unit 103 determines that the attribute determination has been completed for all the people (Yes in S304), and finishes Step S203. The information about the attributes thus obtained is managed as shown in the second and the third row of the table shown in FIG. 9 (as the people with the human IDs "21" and "22").

Next, as shown in Step (d) in FIG. 35, the search-target object specifying unit 2501 specifies the search-target object. The following explains a specific example with reference to the flowchart shown in FIG. 26. First, in S2601, the search-target object specifying unit 2501 selects the human areas corresponding to the human IDs "21" and "22" from the human area management information 801. In S2602, the search-target object specifying unit 2501 selects the search-target object corresponding to the human IDs "21" and "22" by using the attribute/object correspondence information 2801. The difference between the x coordinates of the top-left points of the human areas corresponding to the human IDs "21" and "22" is 300−50=250. This is greater than the sum of the widths (48+60=108) of the human areas corresponding to the human IDs "21" and "22". Since the attributes of the human IDs "21" and "22" are both "Suit" and "Male", the search-target object specifying unit 2501 selects "Sign for entrance ceremony" as the search-target object. The search-target object specifying unit 2501 adds the search-target object ID "21" to the search-target object, and writes it into the search-target object management information 2901 together with the human IDs "21" and "22". In S2603, the search-target object specifying unit 2501 determines that the selection of the search-target objects has been completed for every combination of the human IDs (Yes in S2603), and finishes the processing. In the example shown in FIG. 29, the information about the search-target object specified by the above-described procedures are managed as shown in the first row (i.e. the search-target object with the search-target object ID "21").

Next, as shown in Step (*e*) in FIG. 35, the search-target area specifying unit 2502 specifies the search-target area. The following explains a specific example with reference to the flowchart shown in FIG. 27. First, in S2701, the search-target area specifying unit 2502 selects the row consisting of the object ID "21", the human ID "21" for the first person, the human ID "22" for the second person, and the search-target object "Sign for entrance ceremony" from the search-target object management information 2901. Subsequently, in S2702, the search-target area specifying unit 2502 refers to the object/size correspondence information 3001 and specifies Sw=0.5 as the ratio of the width of "Bouquet" to the width of the human area and Sh=0.1 as the ratio of the height of "Bouquet" to the height of the human. In S2703, the search-target area specifying unit 2502 refers to the object/search-target area type correspondence information 3101, and selects "Between two people" as the search-target area type corresponding to the "Sign for entrance ceremony". In S2704, the search-target area specifying unit 2502 obtains the position and the size of the search-target area of the search-target object thus specified. In the present embodiment, the search-target area specifying unit 2502 specifies the position and the size of the search-target area by the search-target area formulas 9 through 12 by using the information about the human areas of the two people stored in the human area management information 801 and the coefficients stored in the search-target area parameter information 3201. From the search-target area parameter information 3201, $\alpha1=0.5$, $\alpha2=-1$, $\beta1=1$, $\beta2=-1$, $\gamma1=0$, $\gamma2=-2$, $\delta1=0$ and $\delta2=2$ are selected as the search-target area parameters corresponding to the search-target area type "Between two people". From Formula 9, Formula 10, Formula 11, Formula 12 and the search-target area parameters, the search-target area can be obtained by the following Formula 13, Formula 14, Formula 15 and Formula 16:

$$dX=0.5 \times w0 - Sw \times w0 \quad \text{(Formula 13)}$$

$$dY=h0 - Sh \times h0 \quad \text{(Formula 14)}$$

$$W=2 \times Sw \times w0 \quad \text{(Formula 15)}$$

$$H=2 \times Sh \times h0 \quad \text{(Formula 16)}$$

Here, as shown in the human area management information 801, the human area corresponding to the human ID "21" is the area with the top-left coordinates (x,y)=(50,200), a width of 48 pixels and a height of 336 pixels, and the human area corresponding to the human ID "22" is the area with the top-left coordinates (x,y)=(300,180), a width of 60 pixels and a height of 420 pixels. Therefore, the midpoint M (x0,y0) between the top-left coordinates of the human areas corresponding to the human IDs "21" and "22" is (175,190), and the average width w0 is 54 and the average height h0 is 378. Therefore, from Formula 13, Formula 14, Formula 15 and Formula 16, the search-target area specifying unit 2502 obtains dX=−54, dY=−189, W=162 and H=1134. That is, the search-target area specifying unit 2502 obtains, as the search-target area, a rectangular area with the top-left coordinates (121,1), a width of 162 and a height of 1134. The search-target area specifying unit 2502 associates the search-target area information thus obtained with the search-target object ID "21" and writes them into the search-target area management information 1501. In S2705, the search-target area specifying unit 2502 determines that the search target area has been obtained for every search-target object, and finishes the processing. In the example shown in FIG. 15, the information about the search-target object specified by the above-described procedures are managed as shown in the fourth row (i.e. the search-target object with the search-target object ID "21").

Then, the object recognition unit 106 performs the object recognition. The following explains a specific example with reference to the flowchart shown in FIG. 6. First, in S601, the object recognition unit 106 selects the row consisting of the search-target object ID "21" and the search-target object "Sign for entrance ceremony" from the search-target object management information 2901. In S602, the object recognition unit 106 specifies the search-target area corresponding to the search-target object ID "21", which is represented by the top-left coordinates (121,1), the width 162 and the height 1134, from the search-target area management information 1501. Then, the object recognition unit 106 obtains the image feature of the specified area. In S603, using the image feature obtained in S602, the object recognition unit 106 determines whether the search-target object is contained in the search-target area by using the SVM. The results of the object recognition are associated with the search-target object ID "21" and managed as the object recognition management information 1601. In S604, the object recognition unit 106 determines that the object recognition has been performed for every search-target object, and finishes the processing. In the example shown in FIG. 16, the results of the object recognition performed as described above are managed as shown in the fourth row (i.e. the search-target object with the search-target object ID "21").

As described above, the image recognition device 2500 pertaining to the present embodiment specifies the search-target object based on the attributes of a plurality of reference objects, and specifies the relative search-target object in association with the search-target object. Therefore, when a plurality of people are captured in an image, the objects related to the attributes of the people can be searched for within the search-target area that takes into consideration the attributes of the people and the positional relationship of the people. For example, when recognizing "Sign for entrance ceremony" (a signboard with words "Entrance ceremony" written on it), if only one person is contained in the image, the sign can exist either the left or the right of the person. Therefore, the both sides of the person are set as the search-target areas. On the other hand, when two people with a certain distance between them are contained in the image, it is highly possible that an object related to the attributes of the two people exists between them. Therefore, the search-target area of the sign for entrance is set between the two people. In this way, the present embodiment can set the search-target area for the object recognition according to the number of people, the attributes of the people, and the positional relationship among the people.

Embodiment 3

According to Embodiment 1, the search-target object and the search-target area are selected based on the attributes of the reference object. In addition, when information about the event captured in the image is available, the candidates for the search-target object can be further limited to the objects that can exist in the event. For example, when a female with Japanese style clothing is detected from the image, if the event captured in the image is identified as "Shichi-go-san" festival, the candidates for the search-target object can be limited to objects related to "Shichi-go-san" such as "Chitose-ame" and "Zori", and if the event is identified as "Wedding ceremony", the candidates for the search-target object can be limited to objects related to "Wedding ceremony" such as "Cake" and "Microphone".

The image recognition device pertaining to Embodiment 3 performs the image recognition based on such a concept.

<Structure>

The following describes an image recognition device pertaining to Embodiment 3 with reference to the drawings.

In the following, it is assumed that the reference object is a person, and the embodiment described here achieves different advantageous effects from Embodiment 1 by limiting the candidates for the search-target object based on the event captured in the image in addition to the attributes of the people.

Figure 36:
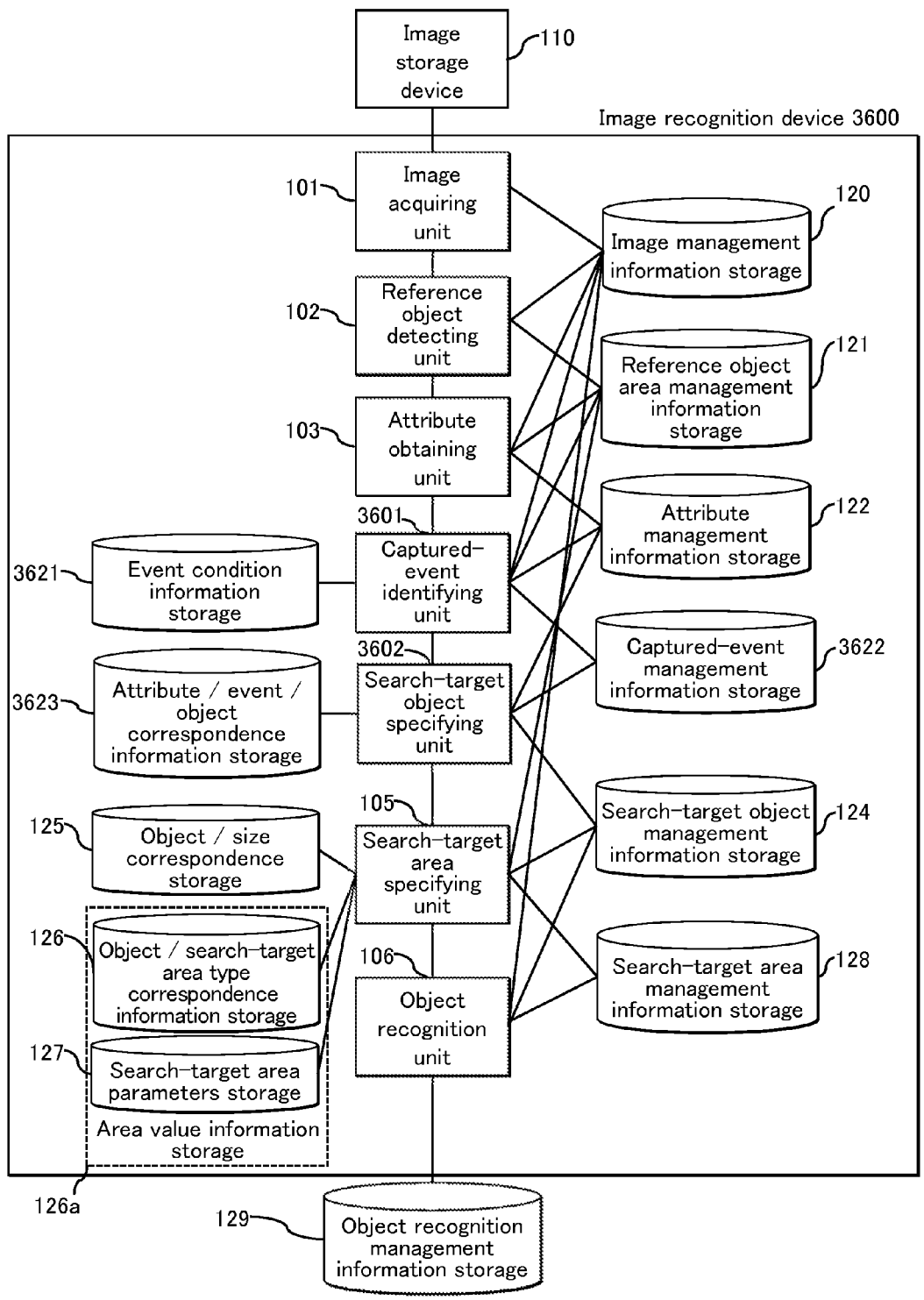
FIG. 36 is a functional block diagram of an image recognition device 3600 pertaining to Embodiment 3.

FIG. 36 is a functional block diagram of an image recognition device 3600 pertaining to Embodiment 3. In Embodiment 3, the substantially same components as Embodiment 1 are given the same reference numbers, and their descriptions are omitted. Among the components of the image recognition device 3600 pertaining to Embodiment 3, a captured-event identifying unit 3601 and a search-target object specifying unit 3602 are the differences from the image recognition device 100 pertaining to Embodiment 1. The following explains the captured-event identifying unit 3601 and the search-target area specifying unit 3602 which are the differences from Embodiment 1.

The captured-event identifying unit 3601 identifies the captured event, namely the event related to the input images, based on the image information acquired by the image acquiring unit 101 and the attributes obtained by the attribute obtaining unit 103.

The search-target object specifying unit 3602 specifies the search-target object based on the area information obtained by the reference object detecting unit 102, the attributes obtained by the attribute obtaining unit 103 and event management information obtained by the captured-event identifying unit 3601.

<Operations>

Figure 37:
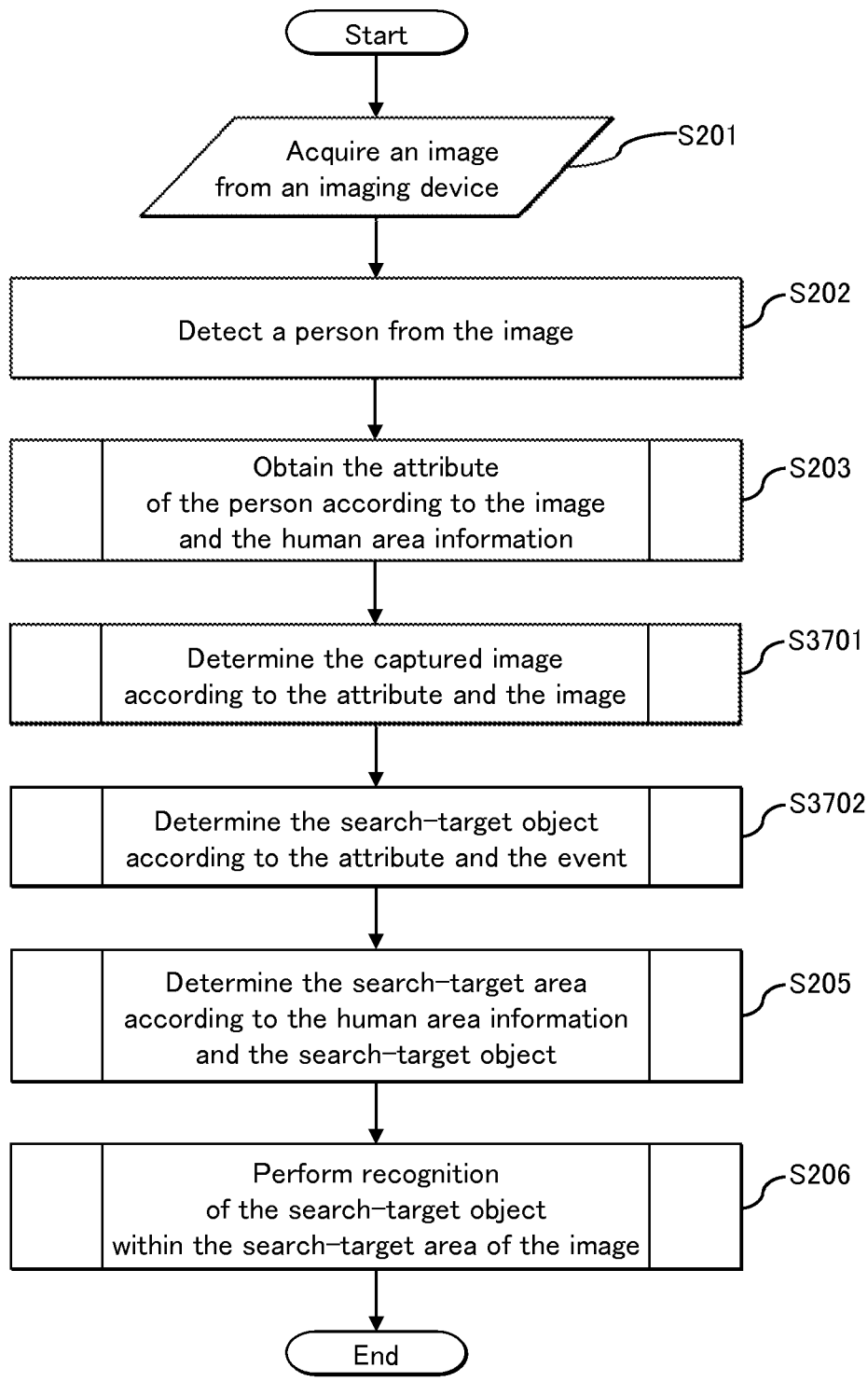
FIG. 37 is a flowchart showing processing procedures pertaining to Embodiment 2 performed for recognizing an object based on an input image from an image storage device 110.

The following describes the entire operations of an image recognition device pertaining to the present embodiment. FIG. 37 is a flowchart showing an example of the entire operations performed by the image recognition device pertaining to the present embodiment.

The procedures from S201 to S203 are the same as S201 to S203 shown in FIG. 2 described above. Therefore, their explanations are omitted.

The captured-event identifying unit 3601 identifies the event based on information of the image acquired by the image acquiring unit 101 and the attribute management information 901 (S3701). Specifically, the captured-event identifying unit 3601 identifies the event based on the recording date of the image and the attributes of the person detected from the image. Examples of the attributes of a person include the clothing and the gender.

The search-target object specifying unit 3602 specifies the search-target object based on the attribute management information 901 and the event identified by the captured-event identifying unit 3601 (S3702).

The subsequent procedures from S205 to S206 are the same as S205 to S206 shown in FIG. 2 described above. Therefore, their explanations are omitted.

Figure 38:
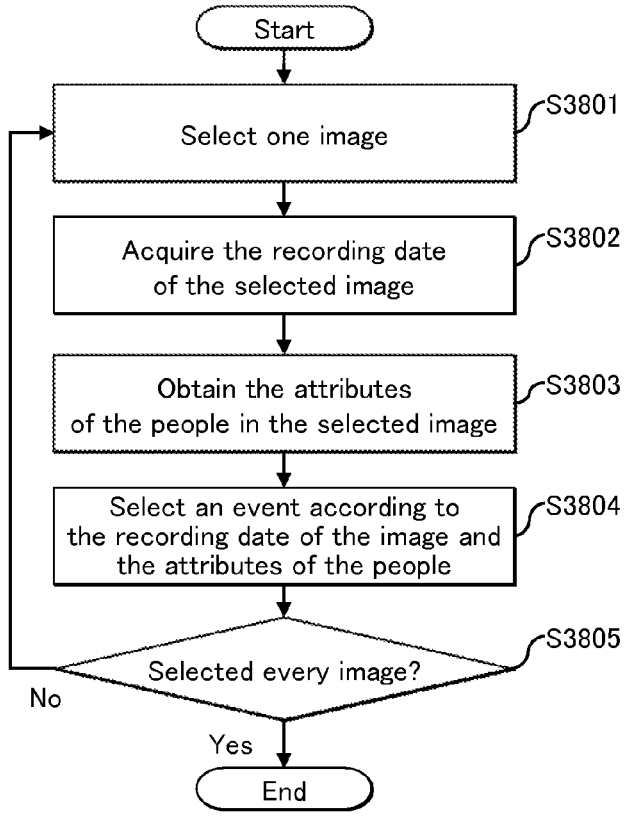
FIG. 38 is a flowchart showing an example of processing procedures pertaining to Embodiment 3 performed for specifying an event captured in an image.

The following explains an example of S3701 shown in FIG. 37 with reference to the flowchart shown in FIG. 38.

First, the captured-event identifying unit 3601 selects one of the image IDs of the images acquired by the image acquiring unit 101 (S3801). Specifically, the captured-event identifying unit 3601 selects a row including an image ID from the table of the image management information as shown in FIG. 7.

Next, the captured-event identifying unit 3601 acquires the recording date of the image (S3802). Specifically, the recording date acquired from the image management information 701 in S3801 is determined as the recording date of the image.

Next, the captured-event identifying unit 3601 obtains the attributes of the person captured in the image (S3803). Specifically, the captured-event identifying unit 3601 acquires the human ID of the person contained in the image from the row of the human area management information 801 including the image ID, and obtains the attributes of the person from the row of the attribute management information 901 including the human ID.

Next, the captured-event identifying unit 3601 identifies the event based on the recording date of the image acquired in S3802 and the attributes of the person detected from the image (S3804). The captured-event identifying unit 3601 identifies the event by using the event condition information which associates the attributes of people detected from an image, recording dates and events with each other. Specifically, the captured-event identifying unit 3601 selects an event associated with the attributes and the recording date satisfying a condition defined by the event condition information. The attributes and the recording date are acquired in S3802 and S3803 respectively. The event condition information is stored in the event condition information storage 3621.

FIG. 40 shows an example of the event condition information 4001 stored in the event condition information storage 3621. In the example shown in FIG. 40, conditions of the clothing, the gender and the recording date are associated with the event. The first row in FIG. 40 shows that when a person with the attributes "Wedding dress" and "Female" is captured in the image, the event "Wedding ceremony" is to be selected regardless of the recording date. The second row shows that when a person with the attributes "Japanese style" and "Female" is captured in the image and the recording date is "January", the event "Seijin-shiki" (coming-of-age ceremony) is to be selected. This is because Seijin-shiki in Japan is held in January. The third row shows that when a person with the attribute "Japanese style" is captured in the image and the recording date is "November", the event "Shichi-go-san" is to be selected. This is because "Shichi-go-san", which is the festival day on which children aged seven, five and three visit a shrine, is usually held in November.

The captured-event identifying unit 3601 searches the event condition information 4001 as shown in FIG. 40 from top to bottom for the event that satisfies the condition of the clothing, the gender and the recording date, and thus identifies the event.

Then, the captured-event identifying unit 3601 writes the identified event to a captured-event management information storage 3622, as captured-event management information 4101.

FIG. 41 shows an example of the captured-event management information 4101. In the example shown in FIG. 41, the events are managed in association with the image IDs. In this example, the event associated with the image ID "31" is "Shichi-go-san".

After S3804, the captured-event identifying unit 3601 determines whether the identification of the event has been completed for every image (S3805). If the identification has not been completed for any of the images (No in S3805), the captured-event identifying unit 3601 returns to S3801. In S3805, if the search-target object has been selected for every human in the image (Yes in S3805), Step S3701 completes.

According to the description above, each image is associated with only one event. However, the present invention is not limited in this way. For example, all the events satisfying the conditions of the attributes and the recording date defined by the event condition information 4001 may be stored in the captured-event management information 4101. For example, when a person with the attributes "Japanese style" and "Female" and a person with "Wedding dress" and "Female" are detected from an image captured in January, events "Wedding ceremony" and "Seijin-shiki", which satisfy the conditions defined by the event condition information 4001 may be both written into the captured-event management information 4101 in association with the image ID.

According to the description above, all the attributes and the recording dates are specified before identifying the event. However, the present invention is not limited in this way. Only some of the attributes and the recording dates may be specified before identifying the event. If this is the case, all the events that satisfy the specified attributes and recording dates may be written into the captured-event management information 4101. For example, when a person with the attributes "Japanese style" and "Female" is detected from an image with an unspecified recording date, the events "Seijin-shiki" and "Shichi-go-san", which satisfy the conditions defined by the event condition information 4001, may be written into the captured-event management information 4101 in association with the image ID.

According to the description above, the event is identified based on the image information and the attributes. However, the method for identifying the event is not limited in this way. For example, the event may be identified based on input from a user. Specifically, instead of the captured-event identifying unit 3601, the user may input information about the event captured in each image managed in the image management information storage 120, and the captured-event management information storage 3622 may manage the information about the events in association with the image IDs.

Figure 39:
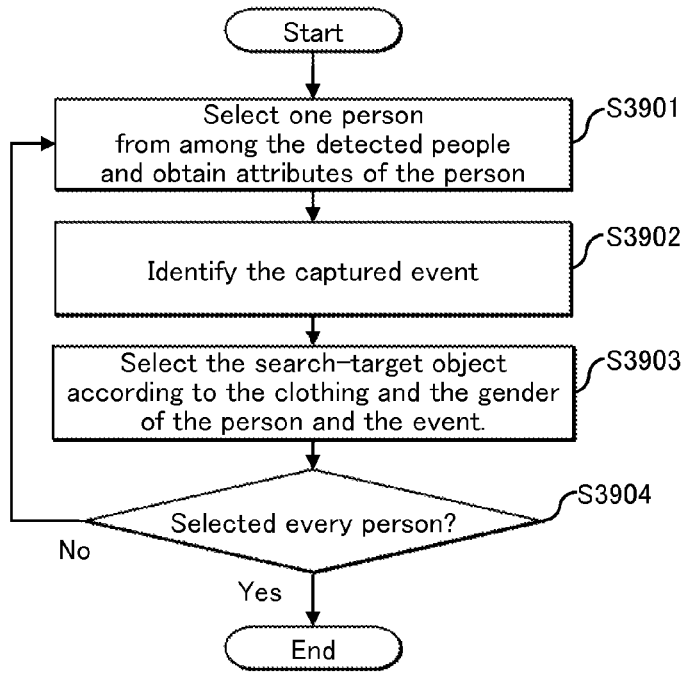
FIG. 39 is a flowchart showing an example of processing procedures pertaining to Embodiment 3 performed for specifying a search-target area.

The following explains an example of S3702 pertaining to the present embodiment with reference to the flowchart shown in FIG. 39.

First, the search-target object specifying unit 3602 selects one human ID from among the human IDs of the people detected from the image, and obtains the attributes associated with the human ID of the selected person (S3901). Specifically, the search-target object specifying unit 3602 selects a row including a human ID from the table of the attribute management information 901 as shown in FIG. 9.

Next, the search-target object specifying unit 3602 acquires event information corresponding to the selected human ID (S3902). Specifically, the search-target object specifying unit 3602 acquires the image ID contained in the row of the human area management information 801 including the selected human ID. Thus, the search-target object specifying unit 3602 acquires the image ID of the image in which the person with the selected human ID is captured. Then, the search-target object specifying unit 3602 acquires the event included in the row including the specified image ID from the captured-event management information 4101.

Next, the search-target object specifying unit 3602 specifies the search-target objects based on the attributes and the event corresponding to the selected human ID (S3903). For example, the search-target object specifying unit 3602 specifies the search-target object matching the attributes corresponding to the selected human ID by using attribute/event/object correspondence information 4201 stored in attribute/event/object correspondence information storage 3623. The attribute/event/object correspondence information 4201 shows the relationship among the attributes, the events and the search-target objects.

FIG. 42 shows an example of the attribute/event/object correspondence information 4201. In the example shown in FIG. 42, candidates for the search-target objects are managed in association with the attributes, namely the clothing and the gender, and the event. The first row in the table shown in FIG. 42 shows that the search-target objects for "Male" wearing "Suit" in the event "Wedding ceremony" are "Cake" and "Microphone". The fourth row shows that the search-target object for "Male" wearing "Japanese style" clothing in the event "Shichi-go-san" is "Chitose-ame" (a stick candy wrapped in an elongated bag), which is typically sold at "Shichi-go-san" festival.

Then, the search-target object specifying unit 3602 associates each of the specified search-target objects with a unique search-target object ID, and writes them into the search-target object management information storage 124, as the search-target object management information 1101.

If a plurality of events are associated with a single image ID in the captured-event management information 4101, the search-target object specifying unit 3602 may specifies one search-target object for each of the events, and write them into the search-target object management information 1101. For example, suppose the case where the events "Wedding ceremony" and "Shichi-go-san" are associated with a single image ID in the captured-event management information 4101. If this is the case, the objects "Cake" and "Microphone" as the search-target objects corresponding to the event "Wedding ceremony" are specified as the search-target objects for a person with the attributes "Japanese style" and "Female, and the objects "Chitose-ame" and "Zori" are specified as the search-target objects corresponding to the event "Shichi-go-san". Then, the search-target object specifying unit 3602 may write the search-target objects "Cake", "Microphone", "Chitose-ame" and "Zori" into the search-target object management information 1101 in association with the person.

After Step S3903, the search-target object specifying unit 3602 determines whether the search-target objects have been specified for every human contained in the image (S3904). If the search-target object specifying unit 3602 has not specified the search-target objects for any of the humans (No in S3904), the search-target object specifying unit 3602 returns to Step S3901. In S3904, if the search-target object has been selected for every human in the image (Yes in S3904), Step S3702 completes.

<Example Operations Performed by Embodiment 3>

Figure 43:
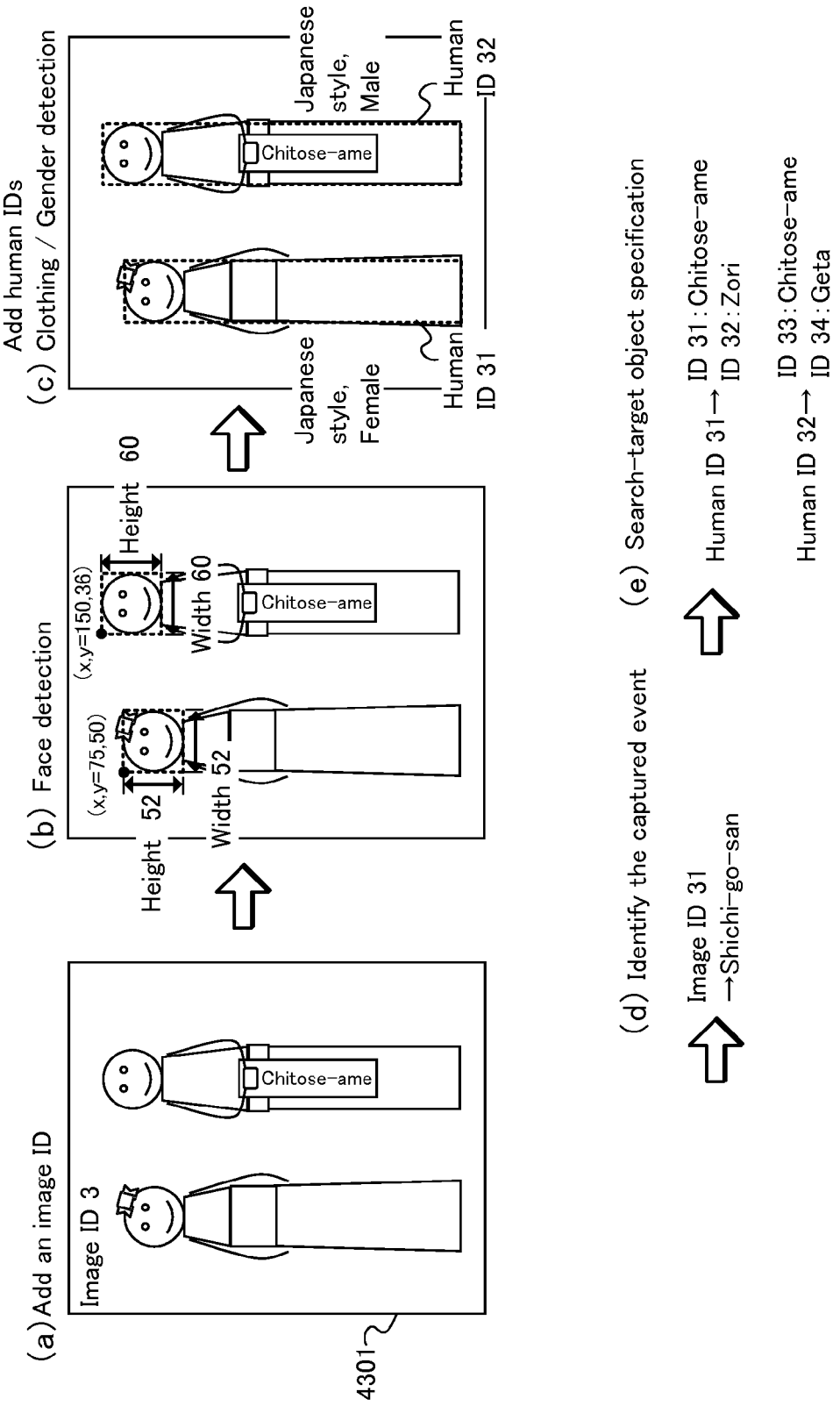
FIG. 43 shows an example of an input image pertaining to Embodiment 3.

The following specifically explains the series of operations performed by the image recognition device 3600 to specify the search-target object in the image 4301 shown in FIG. 43 (to the point the search-target object management information 1101 is stored in the search-target object management information storage 124), with reference to the flowchart shown in FIG. 37 and FIG. 43. The image 4301 shown in FIG. 43 is a picture of a girl wearing "Japanese style" clothing and a boy wearing "Japanese style" clothing with "Chitose-ame" held in his hand, captured at "Nov. 6, 2011, 9:20:15".

First, as shown in Step (a) in FIG. 43, the image acquiring unit 101 acquires the image 4301 (S201). Next, the image acquiring unit 101 adds the image ID "31" to the image thus acquired, and manages them as the image management information 701, together with the recording date. The information of the image shown in FIG. 43 is managed as shown in the third row of the table shown in FIG. 7 (as the image with the image ID "31").

Next, as shown in Step (b) in FIG. 43, the reference object detecting unit 102 detects a human from the input image (S202). First, the reference object detecting unit 102 detects the face. Suppose that the coordinates (x,y) of the top-left point of the facial area of the first person are (x,y)=(75,50), the width is 50 pixels, and the height is 50 pixels, and the coordinates (x,y) of the top-left point of the facial area of the second person are (x,y)=(150,36), the width is 52 pixels, and the height is 52 pixels. If this is the case, as shown in Step (c) in FIG. 43, the reference object detecting unit 102 defines, as the human area, the sum of the facial area and a rectangular area six times the facial area arranged immediately below the facial area, in the same manner as shown in FIG. 18. That is, the human area for the first person will be the area with the top-left coordinates (x,y)=(75,50), having a width of 50 pixels and a height of 350 pixels, and the human area for the second person will be the area with the top-left coordinates (x,y)=(150,36), having a width of 52 pixels and a height of 364 pixels. The reference object detecting unit 102 adds human IDs "31" and "32" in this order to the detected people, and writes them into the human area management information 801 together with the information about the human areas. The information about the people is managed as shown in the fourth and the fifth row of the table shown in FIG. 8 (as the people with the human IDs "31" and "32").

Next, the attribute obtaining unit 103 obtains the attributes of the people (S203). The following explains a specific example of Step S203 with reference to the flowchart shown in FIG. 3. First, in S301, the attribute obtaining unit 103 selects the human ID "31" from the human area management information 801. In S302, the attribute obtaining unit 103 determines that the clothing of the person with the human ID "31" is "Japanese style". In S303, the attribute obtaining unit 103 determines that the gender of the person with the human ID "31" is "Female". As a result, the attributes "Japanese style" and "Female" are written into the attribute management information 901 in association with the human ID "31". Since the attributes of the person with the human ID "32" have not be obtained, the attribute obtaining unit 103 determines negatively ("No") in S304, and returns to S301. Next, in S301, the attribute obtaining unit 103 selects the human ID "32" from the human area management information 801. In S302, the attribute obtaining unit 103 determines that the clothing of the person with the human ID "32" is "Japanese style". In S303, the attribute obtaining unit 103 determines that the gender of the person with the human ID "32" is "Male". As a result, the attributes "Japanese style" and "Male" are written into the attribute management information 901 in association with the human ID "32". In S304, the attribute obtaining unit 103 determines that the attribute determination has been completed for all the people (Yes in S304), and finishes Step S203. The information about the attributes thus obtained is managed as shown in the fourth and the fifth row of the table shown in FIG. 9 (as the people with the human IDs "31" and "32").

Next, as shown in Step (d) in FIG. 43, the captured-event identifying unit 3601 identifies the event (S3701). The following explains a specific example with reference to the flowchart shown in FIG. 38. First, in S3801, the captured-event identifying unit 3601 selects the image ID "31" from the image management information 701. In S3802, the captured-event identifying unit 3601 acquires the recording date "Nov. 6, 2011, 9:20:15" from the image management information 701. In S3803, the captured-event identifying unit 3601 refers to the human area management information 801, and selects the human IDs "31" and "32" as the human IDs of the people detected from the image with the image ID "31". From the attribute management information 901, the captured-event identifying unit 3601 specifies the attributes "Japanese style" and "Female" as the attributes of the person with the human ID "31", and specifies the attributes "Japanese style" and "Male" as the attributes of the person with the human ID "32". In S3804, since the recording date and the attributes of the human ID "31" satisfy the conditions for the event "Shichi-go-san" in the event condition information 4001, the captured-event identifying unit 3601 specifies "Shichi-go-san" as the event. Then, the captured-event identifying unit 3601 writes the event "Shichi-go-san" into the captured-event management information 4101 in association with the image ID "31". In S3805, the captured-event identifying unit 3601 determines that the event identification has been completed for all the images (Yes in S3805), and finishes Step S3701. The information of the event thus specified is managed as shown in the first row of the table shown in FIG. 41 (as the image with the image ID "31").

Next, as shown in Step (e) in FIG. 43, the search-target object specifying unit 3602 specifies the search-target object (S3702). The following explains a specific example with reference to the flowchart shown in FIG. 39. First, in S3901, the search-target object specifying unit 3602 selects the attributes "Japanese style" and "Female" corresponding to the human ID 31 from the attribute management information 901. In S3902, the search-target object specifying unit 3602 specifies the image with the image ID "31" corresponding to the human ID "31" from the human area management information 801, and identifies the event captured in the image with the image ID "31" as "Shichi-go-san" based on the captured-event management information 4101. In S3903, the search-target object specifying unit 3602 refers to the attribute/event/object correspondence information 4201 and specifies "Chitose-ame" and "Zori" as the search-target objects corresponding to the human ID "31". The search-target object specifying unit 3602 adds the search-target object IDs "31" and "32" to these search-target objects, and writes them into the search-target object management information 1101 together with the human ID "31". Since the attributes of the person with the human ID "32" have not be obtained, the search-target object specifying unit 3602 determines negatively ("No") in S3904, and returns to S3901.

Next, in S3901, based on the attribute management information 901, the search-target object specifying unit 3602 specifies the attributes "Japanese style" and "Male" as the attributes of the person with the human ID "32". In S3902, the search-target object specifying unit 3602 specifies the image with the image ID "31" corresponding to the human ID "32" from the human area management information 801, and identifies the event as "Shichi-go-san" based on the captured-event management information 4101. In S3903, the search-target object specifying unit 3602 specifies "Chitose-ame" and "Geta" as the search-target objects corresponding to the human ID "32", based on the attribute/event/object correspondence information 4201. The search-target object specifying unit 3602 adds the search-target object IDs "33" and "34" in this order to these search-target objects, and writes them into the search-target object management information 1101 together with the human ID "32". In S3903, since the search-target object has been selected for the people ("Yes"), the search-target object specifying unit 3602 finishes S3702. In the example shown in FIG. 11, the information about the search-target object specified by the above-described procedures are managed as shown in the fourth, the fifth, the sixth and the seventh row (i.e. the search-target objects with the search-target object IDs "31", "32", "33" and "34").

As described above, the image recognition device 3600 pertaining to the present embodiment specifies the search-target object according to the captured event in addition to the attributes of the reference object. Therefore, the present embodiment can further limit the candidates for the search-target object compared to the case of limiting the candidates for the search-target object according only to the attributes of the reference object.

When the input is a plurality of images captured in an event, the captured-event identifying unit 3601 may specify the event related to the input images according to the recording date of each image and the attributes of the people detected in each image. Specifically, when at least one of the attributes detected from each image is characteristic for example, all the images may be associated with the event identified based on the characteristic attribute. For example, when at least one "Wedding dress" is detected from the images captured during an event, the event during which the images were captured may be identified as "Wedding ceremony". Furthermore, the event may be identified based on the attribute that is most frequently detected from the images. For example, when the clothing that most frequently appears in the images captured in an event is "Japanese style", and the recording dates of some images is November, the event associated with these images may be identified as "Shichi-go-san".

As a result, the image recognition device can identify the event in a "robust" manner based on the attributes of people captured in a plurality of images.

Modifications

So far image recognition devices pertaining to embodiments have been described above. However, the present invention is not limited to the embodiments described above, and the following modifications may be adopted.

(1) In the description above, it is stated that the image recognition device pertaining to Embodiment 1 can be used for classifying the scenes where images were captured. In the case of performing object recognition on one image at a time and using the results for determining the scene, the candidates for the search-target object may be narrowed down each time according to the results of the object recognition previously performed.

That is, since it can be assumed that a same scene does not occur in a single event again (e.g. bouquet toss would not occur twice in a same wedding ceremony), the object already recognized in any of the images may be excluded from the candidates for the search-target object in the subsequent procedures.

Figure 44:
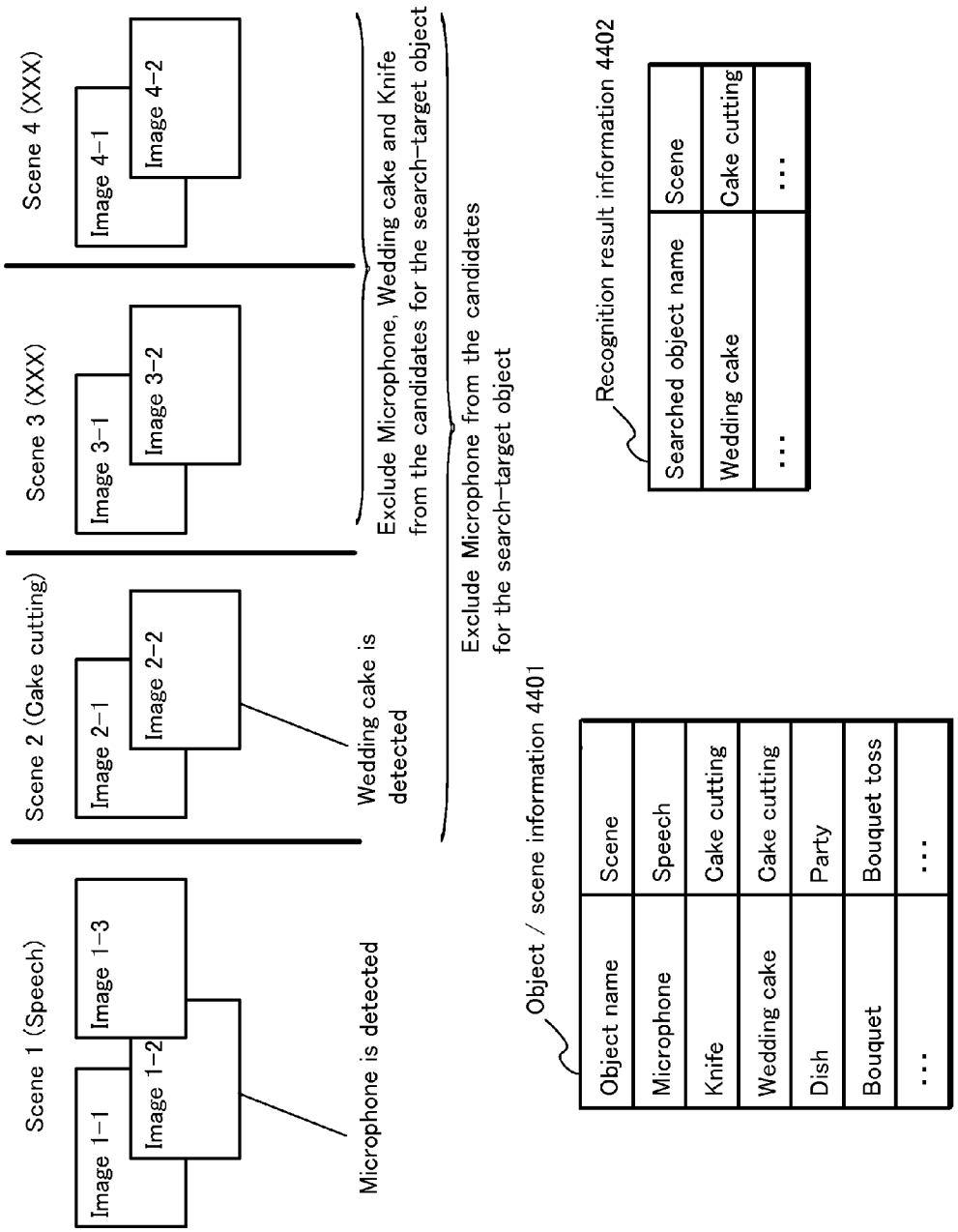
FIG. 44 shows an example of object/scene information and an example of recognition result information.

For example, as shown in FIG. 44, the image recognition device 100 acquires the recording dates from nine images (image 1-1 through image 4-2) belonging to a same event, namely "Wedding ceremony", from the image management information storage 120. Note that the nine images are classified into scene 1 through scene 4 according to their respective recording dates, the interval between the recording dates, or the like.

The image recognition device 100 performs the procedures described above with reference to the flowchart shown in FIG. 37 for each of the images 1-1 through 4-2, and determines the scene to which the image belongs with reference to object/scene information 4401.

Suppose the case where the image recognition device 100, through the series of procedures, detects "Microphone" from the image 1-2 and determines that the scene to which the images 1-1 through 1-3 belong is "Speech".

In such a case, the image recognition device 100 excludes "Microphone" from the candidates for the search-target object in the subsequent procedures.

In the subsequent procedures, assume the case where the image recognition device 100 detects "Wedding cake" from the image 2-2, and determines that the scene to which the images 2-1 and 2-2 belong is "Cake cutting".

In such a case, the image recognition device 100 excludes "Microphone" "Wedding cake" and "Knife" from the candidates for the search-target object in the subsequent procedures.

Note that "Knife" is also excluded from the candidates for the search-target object in addition to "Microphone" and "Wedding cake" actually detected. This is because a knife is characteristic object appearing in the scene of cake catting as shown in the object/scene information 4401, and it can be assumed that no knife occurs again in the scenes 3 and 4.

According to the present modification, when determining the scenes to which the images captured during an event belong according to the object related to the attributes of the reference object, the image recognition device can further narrow down the candidates for the search-target object by using the information about the scenes which have already been determined.

(2) According to Embodiment 1 described above, a human, which is a relatively easy-to-recognize object, is used as the reference object. However, another object than a human may be used as the reference object.

For example, a car may be used as the reference object. The image recognition device 100 pertaining to the present modification detects a car from the image by using the reference object detecting unit 102. To detect a car, the method discussed in "Vehicle detection by two-stage AdaBoost with Joint HOG Features" written by Ozaki, Yamauchi and Fujiyoshi may be adopted. The attribute obtaining unit 103 detects attributes that give characteristic meanings to an object. Examples of the attributes include the state of the door, namely whether the door is open or closed, and the speed of the car. The search-target object specifying unit 104 selects an object related to the attribute of the car as the search-target object.

For example, the search-target object specifying unit 104 selects a person as the search-target object for a car with an open door, and selects a traffic light as the search-target object for a car with a speed of 0. The search-target area specifying unit 105 selects a relative search-target area type for the car based on the search-target object, and obtains the search-target area based on the area information of the car and the relative search-target area type for the car. For example, when the search-target object is a person, the search-target area specifying unit 105 selects "Beside the door" as the relative search-target area type, and when the search-target object is a traffic light, the search-target area specifying unit 105 selects "Above the car" as the relative search-target area type. The search-target area specifying unit 105 obtains the search-target area based on the coefficients of the search-target area formulas associated with each of the relative search-target area type. The object recognition unit 106 performs object recognition as to the search-target object specified by the search-target object specifying unit 104 within the search-target area specified by the search-target area specifying unit 105, and manages the results of the object recognition in the object recognition management information storage 129.

According to this modification, the image recognition device 100 can recognize the object (such as a person and a traffic signal) related to the attributes of the car by narrowing down the candidates for the search-target object and the search-target area based on the attributes of the car.

FIG. 45 shows an example of attribute management information 4501 and an example of object/search-target area type correspondence information 4502 in the case the reference object is a car.

In addition to a person and a car, a pet like a dog and a cat may be used as the reference object.

The requirement to be the reference object is that it is relatively easy-to-recognize object (or person) compared to the search-target object so that the reference object can be a clue for recognizing the search-target object.

Here, as to the reference object, "relatively easy-to-recognize" compared to the search-target object means that the object is known in the technical field of object recognition as an object that can be recognized with a high degree of accuracy. However, objects that can be the reference object or the search-target object may vary according to various factors, such as the type of the object recognition method that can be actually adopted in the image recognition device using the method pertaining to the embodiments and the processing load and the processing time acceptable for the recognition. Furthermore, the objects that can be the reference object of the search-target object may vary according to development of the object recognition technology in the future.

(3) The image recognition devices pertaining to the embodiments described above may be realized as, for example, the following devices provided with the functions of the image recognition devices: an AV device such as a BD recorder; a personal computer; a stationary terminal such as a server terminal; or a mobile device such as a digital camera and a mobile telephone.

Furthermore, the present invention may be realized as a server device that provides the method described for the embodiments above in the form of network services. If this is the case, upon receiving contents from a device storing contents such as an AV device, a personal computer or a digital camera via a network, the server device may perform the image recognition on the received contents by using the method described above for the embodiments, and send the results of the image recognition to the device such as an AV device, a personal computer or a digital camera via a network.

In this case, the image recognition by the method described above for the embodiments may be performed on both the contents that the image recognition device receives from an external device and the contents that the image recognition device stores therein.

The method described above may be realized by a Central Processing Unit (CPU) or the like reading from a memory a program describing the processing procedures of the method described above for the embodiments and recorded on the memory, and executing the program.

Also, the program describing the processing procedures may be distributed in the form of a recording medium such as a DVD on which the program is recorded. Furthermore, the program describing the processing procedures may be widely distributed via a transmission medium such as the Internet.

The components pertaining to the embodiments described above may be realized as an LSI (Large Scale Integration), which is an integrated circuit. These components may be made into one chip, or part or all of the components may be made into one chip. Although the integrated circuit is referred to as an LSI here, the terms IC (Integrated Circuit), system LSI, super LSI, or ultra LSI are also used, depending on the degree of integration. In addition, the method for assembling integrated circuits is not limited to LSI, and a dedicated communication circuit or a general-purpose processor may be used. Also, it is possible to use a Field Programmable Gate Array (FPGA), which is programmable after the LSI is manufactured, or a ReConfigurable processor, which allows reconfiguration of the connection and setting of circuit cells inside the LSI. Also, the functional blocks may perform their computations by using a DSP (Digital Signal Processor) or a CPU (Central Processing Unit), for example. Furthermore, the processing steps may be recorded on a recording medium as a program and may be executed in the form of a program.

(4) The recognized objects and the scenes classified according to the objects can be used in the following manner.

First, a decorative item may be added to the image according to the recognized object.

In the example shown in FIG. 46A, "Bouquet" is detected from the image 4601 according to the attributes "Wedding dress" and "Female". Then, a decorative item 4601a, which corresponds to "Bouquet" and which is specific to "Wedding ceremony", is added to the image.

Such processing can be enabled by preparing information associating candidates for the objects to be recognized and decorative items, within the image recognition device.

Note that such a decorative item may be automatically added to an image displayed on the screen of a recording device such as a digital still camera, immediately after the image has been captured by the recording device.

Second, the processing may be performed by using the object recognized at trimming of the image.

In the example shown in FIG. 46B, the image 4602 contains a person with the attributes "Suit" and "Male" and a person with the attributes "Wedding dress" and "Female". Also, the object "Wedding cake" is detected in front of the two people. If this is the case, trimming is performed on the image 4602 to generate an image 4603 which contains the two people and the wedding cake. In this way, trimming may be performed so that the image will contain people with particular attributes or detected objects.

Third, the objects and the scenes may be used for designing the layout.

In the example shown in FIG. 46C, a wedding cake is detected by the object recognition from the image 4604a with the page frame 4604 on page 1, and a bouquet is detected by the object recognition from the image 4605a with the page frame 4605 on page 2. According to these results of the recognition, a scene determination unit of the image recognition device determines that the image 4604a shows a scene from cake cutting, and the image 4605a shows a scene from bouquet toss. Note that the images 4605b and 4605c may be selected from images having a recording date that is close to the recording date of the image 4605a, for example.

As described above, the scenes determined based on the object recognition may be used for creating an album or a slideshow, and thus the image recognition device can design the layout according to the flow of the scenes.

(5) The structures described for the embodiments above may be realized by cooperation of a device and a cloud server.

Figure 47A:
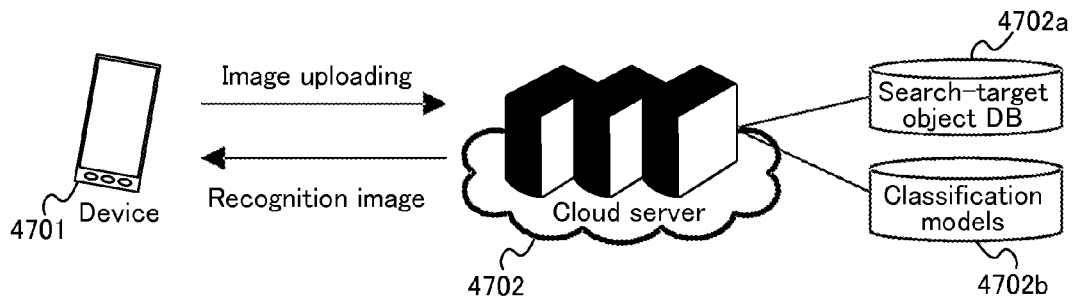
FIGS. 47A through 47C show example cases where a device and a cloud server cooperate.
Figure 47B:
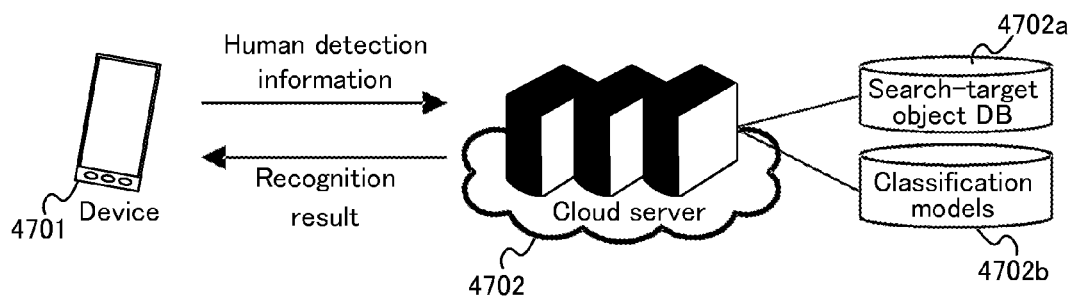

In the examples shown in FIG. 47A and FIG. 47B, the device 4701 uploads an image to the cloud server 4702. The cloud server 4702 performs the processing procedures as described for FIG. 2 on the uploaded image, and sends the device 4701 of the results of the recognition.

With such a structure, processing with particularly heavy load is performed by the cloud server 4702, and thus the processing can be decentralized and can be performed at a high speed. Also, as shown FIG. 47A, it is possible to increase the number of objects that can be recognized and to improve the recognition accuracy by timely updating the search-target object DB 4702*a* and the classification models 4702*b* belonging to the cloud server 4702.

Note that processing with relatively light load (e.g. the human detection in S202 of FIG. 2) may be performed by the device 4701, and the device 4701 may upload the image and the results of the processing to the cloud server 4702.

Also, as shown in FIG. 47B, the device 4701 may perform the reference object detection (S202 in FIG. 2), and send the results of the processing to the cloud server 4702. Such configuration is useful when it is desired to avoid causing the cloud server to perform the reference object detection.

Figure 47C:
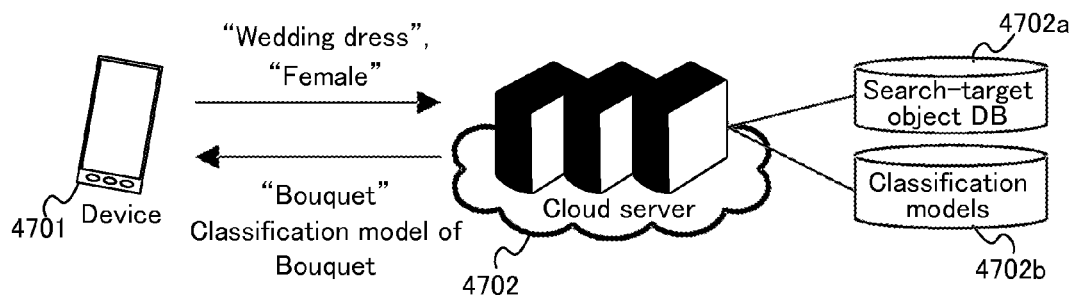

Also, as shown in FIG. 47C, the device 4701 may obtain the attributes (S203 in FIG. 2) and send the results to the cloud server 4702, and in response, the cloud server 4702 may send information specifying the object that can co-occur with the objects having the attributes (e.g. the object "Bouquet" corresponding to the attributes "Wedding dress" and "Female") and the model of the object (e.g. the model of "Bouquet"). With such a structure, the device 4701 does not need to store models of various objects, and this prevents the storage of the device from being occupied largely by the models of the objects.

(6) According to the description about Step (*g*) in FIG. 24 above, the result of the object recognition is either "Yes" (the object exists) or "No" (the object does not exist). However, the device may display a different message according to the likelihood showing the degree of matching with the model.

Figure 48:
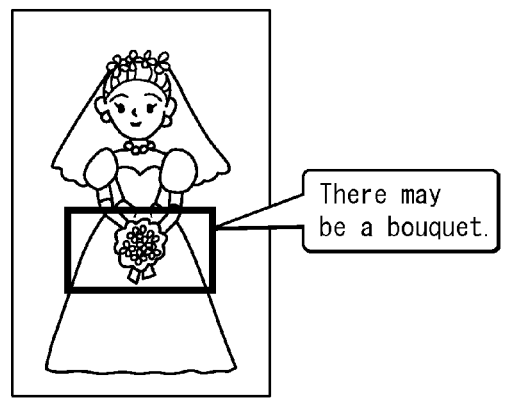
FIG. 48 shows an example presentation of the results of the object recognition.

For example, when the likelihood is not very high, the device may display a message saying "There may be a bouquet." as shown in FIG. 48.

In the case of objects with relatively low recognition accuracy such as a bouquet, such an ambiguous message informs the user of the uncertainty of the recognition, and this improves convenience of the user.

(7) The search-target area specifying unit 105 may specify the search-target area taking into account a depth range defined for each search-target object.

Figure 49:
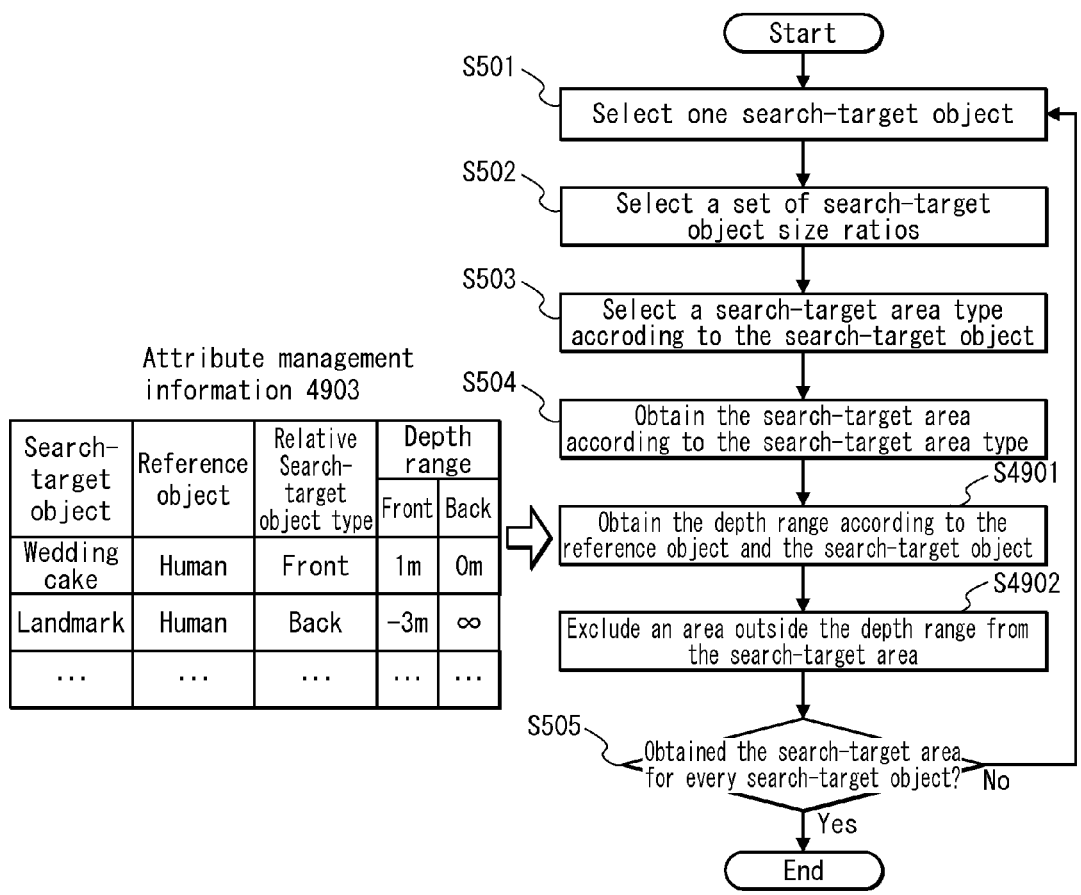
FIG. 49 is a flowchart showing an example of processing procedures pertaining to a modification performed for specifying a search-target area.

FIG. 49 is a flowchart showing an example of processing procedures pertaining to the present modification performed for specifying the search-target area.

The steps S501 through S505 are the same as those shown in FIG. 5 explained above for Embodiment 1.

The following explains S4901 and S4902 based on an example case where the reference object is a person and the search-target object is a wedding cake.

The search-target area specifying unit 105 refers to attribute management information 4903 and obtains the depth range "1 m" and "0 m" corresponding to the reference object "Human" and the search-target object "Wedding cake" (S4901). According to the depth ranges shown in FIG. 49, the reference point is defined at a focal length "0 m", and a point closer to the viewer than the reference point is represented with a positive value and a point farther from the viewer than the reference point is represented with a negative value.

After obtaining the depth range, the search-target area specifying unit 105 refers to the search-target area management information 1501 stored in the search-target area management information storage 128, and obtains the coordinates, the width and the height of the search-target area for "Wedding cake" obtained in S504. Then, the search-target area specifying unit 105 obtains a modified search-target area from which an area outside the area defined by the depth ranges "0 m" and "1 m" are excluded. The search-target area specifying unit 105 overwrites the coordinates, the width and the height of the search-target area in the search-target area management information 1501 with the modified values (S4902).

In the example shown in FIG. 50, the image 5001 contains a wedding cake in front of two people, namely a man and a woman. In the case of this example, the depth of the area on the left side of the man is negative. Therefore, the search-target area specifying unit 105 obtains a modified search-target area by excluding the above-mentioned area from the search-target area obtained in S504.

Regarding the method to obtain the depth of the image, if the image to be used is embedded with depth information for each pixel, the depth information can be used without change. If the image is captured by a compound-eye camera, it is easy to embed such depth information into the image. Of course, even if the image does not embedded with such information, the search-target area specifying unit 105 may prepare a depth map of the image based on the pixel information, the focal length to the subject contained in the Exif information, or the like.

Note that the column of "relative search-target area type" may be omitted from the attribute management information 4903.

(8) According to Embodiment 1, the search-target area is determined with consideration of the displacement (dX,dY) and the ratios of the width and the height of the object to the width and the height of the human area. However, the present invention is not limited in this way.

For example, although the displacement (dX,dY) is described above as including the direction and the magnitude, the displacement may include only the direction. Specifically, in the case of a group photograph capturing many people facing the front, the direction in which the people face may be determined as the direction of the displacement, and the area below the human area may be specified as the search-target area. Furthermore, in the case of an image whose left half contains a person, the area obtained by displacing the human area to the right may be determined as the search-target area.

(9) According to Embodiments 1 and 2, as shown in FIG. 24 and FIG. 35, first the coordinates of the top-left point related to the human area is moved and then the area with the origin at the top-left point after the move, having a height and a width, is obtained as the search-target area. However, it is not essential to move the top-left point.

For example, in the case of the example shown in FIG. 23, it is possible to first obtain the gravity center of the human area (the star sign in FIG. 23), and then obtain the search-target area whose center point matches this gravity center and has a height and a width.

In the case of the example shown in FIG. 33, it is possible to first obtain the gravity center of the human area for the two people (the star sign in FIG. 33), and then obtain the search-target area whose center point matches this gravity center and has a height and a width.

(10) According to Embodiment 1, the information shown for example in FIGS. 10 through 13, 17, and 28 through 31 includes the names of the candidates for the search-target object so that the names can be used for explanation of the embodiment. However, these names may be replaced with identifiers (IDs) of the candidates for the search-target object. In addition, a table may be prepared for associating the identifiers of the candidates for the search-target object with their names. If this is the case, the image recognition device may refer to the table when presenting the results of the recognition to the user, and may display the names of the candidates of the search-target object together with the results.

Supplemental Descriptions

The Embodiments and their modifications described above include the following aspects of the present invention.

(1) One aspect of the present invention provides an image recognition device comprising: a first recognition unit that performs image recognition within an image to find a first object; an obtaining unit that obtains an attribute of the first object found by the first recognition unit; an object specifying unit that refers to object correspondence information showing identifiers of second objects and associating each identifier with an attribute, and specifies an identifier of one of the second objects that is associated with the attribute of the first object; an area specifying unit that refers to area value information showing values that are associated with the identifiers of the second objects and are related to a first area occupied by the first object, and specifies a second area within the image by using a value associated with the identifier of the one of the second objects; and a second recognition unit that performs image recognition within the second area to find the one of the second objects.

(2) In (1) above, each value of the area value information may show a relative position of the second area to the first area.

(3) In (2) above, each value of the area value information may show a direction and a magnitude of displacement from an original point related to the first area to a destination point located within the second area, and the area specifying unit may refer to the area value information, move the original point to the destination point according to the value associated with the identifier of the one of the second objects, and specify an area including the destination point as the second area.

(4) In (3) above, each value of the area value information may show a width and a height of the first area, a ratio of a width of the second area to the width of the first area, and a ratio of a height of the second area to the height of the first area, and the area specifying unit may refer to the area value information, obtain the width and the height of the second area according to the value associated with the identifier of the one of the second objects, and specify an area including the destination point and having the width and the height as the second area.

(5) In (1) above, the first recognition unit may perform image recognition within an image to find a plurality of first objects, the obtaining unit may obtain attributes of the first objects, the object correspondence information may associate each of the identifiers of the second objects with a combination of attributes, and the object specifying unit may refer to the object correspondence information and specify the identifier of the one of the second objects according to a combination of the attributes of the first objects.

(6) In (5) above, the object correspondence information may further show, for each combination of attributes, an interval between first areas respectively occupied by the first objects, and the object specifying unit may refer to the object correspondence information and specify the identifier of the one of the second objects according to the combination of the attributes of the first objects and to the interval between the first areas.

(7) In (5) above, the area value information may further show a value indicating that an area between the first areas is to be specified as the second area when an interval between the first areas respectively occupied by the first objects is equal to or greater than a first threshold value, and a value indicating that an area traversing the first areas is to be specified as the second area when the interval is equal to or smaller than a second threshold value that is smaller than the first threshold value.

(8) In (1) above, the object correspondence information may associate each of the identifiers of the second objects with a combination of an attribute and an event, the image recognition device may further comprise a captured-event identifying unit that identifies an event captured in the image, and the object specifying unit may refer to the object correspondence information and specify the identifier of the one of the second objects according to the attribute of the first object and the event identified by the captured-event identifying unit.

With the stated structure, the image recognition device can specify the identifier of the one of the second objects according to the event captured in the image. Thus, the image recognition device can appropriately specify the second object.

(9) In (1) above, the image recognition device may further comprise: a captured-event identifying unit that identifies an event captured in the image; and a scene determination unit that refers to scene information showing the identifiers of the second objects and associating each identifier with a scene, and determines a scene captured in the image from among scenes constituting the event, according to the identifier of the one of the second objects.

With the stated structure, the result of the scene determination can be used for classification of images.

(10) In (9) above, in a case where each unit of the image recognition device performs processing sequentially on a plurality of images containing a same event identified by the captured-event identifying unit, after the second recognition unit has found the one of the second objects from one of the plurality of images, the object specifying unit may refer to the scene information and specify an identifier of another one of the second objects contained in another one of the plurality of images from among the identifiers of the second objects excluding an identifier associated with a same scene as the scene captured in the one of the plurality of images.

With the stated structure, the image recognition device excludes particular objects from the candidates for the search-target. Thus, in the subsequent processing, the image recognition device can appropriately specify the one of the second objects from a limited number of candidates.

(11) Another aspect of the present invention provides an image recognition method, comprising: a first recognition step of performing image recognition within an image to find a first object; an obtaining step of obtaining an attribute of the first object found in the first recognition step; an object specifying step of referring to object correspondence information showing identifiers of second objects and associating each identifier with an attribute, and specifying an identifier of one of the second objects that is associated with the attribute of the first object; an area specifying step of referring to area value information showing values that are associated with the identifiers of the second objects and are related to a first area occupied by the first object, and specifying a second area within the image by using a value associated with the identifier of the one of the second objects; and a second recognition step of performing image recognition within the second area to find the one of the second objects.

(12) Another aspect of the present invention provides a computer program for causing a computer to perform image recognition processing, the image recognition processing comprising: a first recognition step of performing image recognition within an image to find a first object; an obtaining step of obtaining an attribute of the first object found in the first recognition step; an object specifying step of referring to object correspondence information showing identifiers of second objects and associating each identifier with an attribute, and specifying an identifier of one of the second objects that is associated with the attribute of the first object; an area specifying step of referring to area value information showing values that are associated with the identifiers of the second objects and are related to a first area occupied by the first object, and specifying a second area within the image by using a value associated with the identifier of the one of the second objects; and a second recognition step of performing image recognition within the second area to find the one of the second objects.

(13) Another aspect of the present invention provides an integrated circuit comprising: a first recognition unit that performs image recognition within an image to find a first object; an obtaining unit that obtains an attribute of the first object found by the first recognition unit; an object specifying unit that refers to object correspondence information showing identifiers of second objects and associating each identifier with an attribute, and specifies an identifier of one of the second objects that is associated with the attribute of the first object; an area specifying unit that refers to area value information showing values that are associated with the identifiers of the second objects and are related to a first area occupied by the first object, and specifies a second area within the image by using a value associated with the identifier of the one of the second objects; and a second recognition unit that performs image recognition within the second area to find the one of the second objects.

[Industrial Applicability]

An image recognition device pertaining to the present invention is applicable to, for example, imaging devices having a function to store still or moving pictures, such as digital still cameras, mobile telephones equipped with a camera, and movie cameras, and to PCs (Personal Computers).

[Reference Signs List]

100, 2500, 3600 Image recognition device
101 Image acquiring unit
102 Reference object detecting unit (First object recognition unit)
103 Attribute obtaining unit
104, 2501, 3602 Search-target object specifying unit
105, 2502 Search-target area specifying unit
106 Object recognition unit (Second object recognition unit)
110 Image storage device
120 Image management information storage
121 Reference object area management information storage
122 Attribute management information storage
123 Attribute/object correspondence information storage
124 Search-target object management information storage
125 Object/size correspondence storage
126 Object/search-target area type correspondence information storage
126a Area value information storage
127 Search-target area parameters storage
128 Search-target area management information storage
129 Object recognition management information storage
130 Object/search-target area parameters storage
701 Image management information
801 Human area management information
901 Attribute management information
1001, 2801 Attribute/object correspondence information
1101, 2901 Search-target object management information
1201, 3001 Object/size correspondence information
1301, 3101 Object/search-target area type correspondence information
1401, 3201 Search-target area parameter information
1501 Search-target area management information
1601 Object recognition management information
1701 Object/search-target area parameter information (Area value information)
2401, 3501, 4301 Image
3601 Captured-event identifying unit 3621 Event condition information storage
3622 Captured-event management information storage
3623 Attribute/event/object correspondence information storage
4001 Event condition information
4101 Captured-event management information
4201 Attribute/event/object correspondence information
4401 Object/scene information

The invention claimed is:

1. An image recognition device comprising:
a processor; and
a non-transitory computer-readable storage medium having stored thereon executable instructions, which when executed by the processor, cause the image recognition device to function as: a first recognition unit that performs image recognition within an image to find a first object;
an obtaining unit that obtains an attribute of the first object found by the first recognition unit;
an object specifying unit that refers to object correspondence information showing identifiers of second objects and associating each identifier with an attribute, and specifies an identifier of one of the second objects that is associated with the attribute of the first object;
an area specifying unit that refers to area value information showing values that are associated with the identifiers of the second objects and are related to a first area occupied by the first object, and specifies a second area within the image by using a value associated with the identifier of the one of the second objects; and
a second recognition unit that performs image recognition within the second area to find the one of the second objects.

2. The image recognition device of claim 1, wherein
each value of the area value information shows a relative position of the second area to the first area.

3. The image recognition device of claim 2, wherein
each value of the area value information shows a direction and a magnitude of displacement from an original point related to the first area to a destination point located within the second area, and
the area specifying unit refers to the area value information, moves the original point to the destination point according to the value associated with the identifier of the one of the second objects, and specifies an area including the destination point as the second area.

4. The image recognition device of claim 3, wherein
each value of the area value information shows a width and a height of the first area, a ratio of a width of the second area to the width of the first area, and a ratio of a height of the second area to the height of the first area, and
the area specifying unit refers to the area value information, obtains the width and the height of the second area according to the value associated with the identifier of the one of the second objects, and specifies an area including the destination point and having the width and the height as the second area.

5. The image recognition device of claim 1, wherein
the first recognition unit performs image recognition within an image to find a plurality of first objects,
the obtaining unit obtains attributes of the first objects,
the object correspondence information associates each of the identifiers of the second objects with a combination of attributes, and
the object specifying unit refers to the object correspondence information and specifies the identifier of the one of the second objects according to a combination of the attributes of the first objects.

6. The image recognition device of claim 5, wherein
the object correspondence information further shows, for each combination of attributes, an interval between first areas respectively occupied by the first objects, and
the object specifying unit refers to the object correspondence information and specifies the identifier of the one of the second objects according to the combination of the attributes of the first objects and to the interval between the first areas.

7. The image recognition device of claim 5, wherein
the area value information further shows
a value indicating that an area between the first areas is to be specified as the second area when an interval between the first areas respectively occupied by the first objects is equal to or greater than a first threshold value, and
a value indicating that an area traversing the first areas is to be specified as the second area when the interval is equal to or smaller than a second threshold value that is smaller than the first threshold value.

8. The image recognition device of claim 1, wherein
the object correspondence information associates each of the identifiers of the second objects with a combination of an attribute and an event,
wherein the executable instructions, when executed by said processor, cause the image recognition device to further function as a captured-event identifying unit that identifies an event captured in the image, and
the object specifying unit refers to the object correspondence information and specifies the identifier of the one of the second objects according to the attribute of the first object and the event identified by the captured-event identifying unit.

9. The image recognition device of claim 1 further comprising:
wherein the executable instructions, when executed by said processor, cause the image recognition device to further function as:
a captured-event identifying unit that identifies an event captured in the image; and
a scene determination unit that refers to scene information showing the identifiers of the second objects and associating each identifier with a scene, and determines a scene captured in the image from among scenes constituting the event, according to the identifier of the one of the second objects.

10. The image recognition device of claim 9, wherein
in a case where each unit of the image recognition device performs processing sequentially on a plurality of images containing a same event identified by the captured-event identifying unit,
after the second recognition unit has found the one of the second objects from one of the plurality of images, the object specifying unit refers to the scene information and specifies an identifier of another one of the second objects contained in another one of the plurality of images from among the identifiers of the second objects excluding an identifier associated with a same scene as the scene captured in the one of the plurality of images.

11. An image recognition method, comprising:
a first recognition step of performing image recognition within an image to find a first object;
an obtaining step of obtaining an attribute of the first object found in the first recognition step;
an object specifying step of referring to object correspondence information showing identifiers of second objects and associating each identifier with an attribute, and specifying an identifier of one of the second objects that is associated with the attribute of the first object;
an area specifying step of referring to area value information showing values that are associated with the identifiers of the second objects and are related to a first area occupied by the first object, and specifying a second area within the image by using a value associated with the identifier of the one of the second objects; and
a second recognition step of performing image recognition within the second area to find the one of the second objects.

12. A non-transitory computer-readable storage medium storing a computer program for causing a computer to perform image recognition processing, the image recognition processing comprising:
a first recognition step of performing image recognition within an image to find a first object;
an obtaining step of obtaining an attribute of the first object found in the first recognition step;
an object specifying step of referring to object correspondence information showing identifiers of second objects and associating each identifier with an attribute, and specifying an identifier of one of the second objects that is associated with the attribute of the first object;
an area specifying step of referring to area value information showing values that are associated with the identifiers of the second objects and are related to a first area occupied by the first object, and specifying a second area within the image by using a value associated with the identifier of the one of the second objects; and
a second recognition step of performing image recognition within the second area to find the one of the second objects.

13. An integrated circuit comprising:
a first recognition circuit that performs image recognition within an image to find a first object;
an obtaining circuit that obtains an attribute of the first object found by the first recognition unit;
an object specifying circuit that refers to object correspondence information showing identifiers of second objects and associating each identifier with an attribute, and specifies an identifier of one of the second objects that is associated with the attribute of the first object;
an area specifying circuit that refers to area value information showing values that are associated with the identifiers of the second objects and are related to a first area occupied by the first object, and specifies a second area within the image by using a value associated with the identifier of the one of the second objects; and
a second recognition circuit that performs image recognition within the second area to find the one of the second objects.

* * * * *